(12) United States Patent
Yates

(10) Patent No.: US 11,727,431 B2
(45) Date of Patent: Aug. 15, 2023

(54) SYSTEM AND METHOD FOR HOMOGENIZING PAYMENT TRANSACTION DATA ACQUISITION FROM DISPARATE POINTS OF SALE

(71) Applicant: Rodney Yates, Gretna, NE (US)

(72) Inventor: Rodney Yates, Gretna, NE (US)

( * ) Notice: Subject to any disclaimer, the term of this patent is extended or adjusted under 35 U.S.C. 154(b) by 0 days.

(21) Appl. No.: 17/493,618

(22) Filed: Oct. 4, 2021

(65) Prior Publication Data
US 2022/0108345 A1 Apr. 7, 2022

Related U.S. Application Data

(60) Provisional application No. 63/087,046, filed on Oct. 2, 2020.

(51) Int. Cl.
| | |
|---|---|
| *G06Q 30/02* | (2023.01) |
| *G06Q 30/0226* | (2023.01) |
| *G06Q 30/0238* | (2023.01) |
| *G06Q 30/0207* | (2023.01) |
| *G06Q 20/20* | (2012.01) |

(Continued)

(52) U.S. Cl.
CPC ....... *G06Q 30/0233* (2013.01); *G06F 16/953* (2019.01); *G06Q 20/202* (2013.01); *G06Q 20/367* (2013.01); *G06Q 20/387* (2013.01); *G06Q 20/4015* (2020.05); *G06Q 30/0236* (2013.01); *G06Q 30/0238* (2013.01); *G06Q 40/02* (2013.01)

(58) Field of Classification Search
CPC ............. G06Q 30/0233; G06Q 20/202; G06Q 20/367; G06Q 20/387; G06Q 20/4015; G06Q 30/0236; G06Q 30/0238; G06Q 40/02
See application file for complete search history.

(56) References Cited

U.S. PATENT DOCUMENTS

| | | | |
|---|---|---|---|
| 7,890,367 B2 | 2/2011 | Senghore et al. | |
| 8,036,929 B1 | 10/2011 | Reisman | |

(Continued)

OTHER PUBLICATIONS

"Elements of Successful Loyalty Model in Merchant Payments" (Published on Oct. 2019 in CGAP—at https://www.cgap.org/research/publication/elements-successful-loyalty-model-merchant-payments) (Year: 2019).*

*Primary Examiner* — James M Detweiler
(74) *Attorney, Agent, or Firm* — Ryan T. Grace; Advent, LLP

(57) ABSTRACT

A method for homogenizing payment transaction data acquisition from disparate merchant points of sale includes tracking payment card transactions between enrolled payment cardholders and enrolled merchants, based on the tracked payment card transactions creating a database of rewards eligible transactions, and querying the database of rewards eligible transactions and creating a homogenized transaction database including a specific set of transaction datums retrieved from the database of rewards eligible transactions, wherein the homogenized transaction database includes transaction, information from at least a first transaction involving a first merchant using a first point of sale system and a second transaction involving a second merchant using a second point of sale system, the first point of sale system and the second point of sale system differing from one another.

18 Claims, 11 Drawing Sheets

(51) Int. Cl.
*G06F 16/953* (2019.01)
*G06Q 20/38* (2012.01)
*G06Q 20/36* (2012.01)
*G06Q 40/02* (2023.01)
*G06Q 20/40* (2012.01)

(56) References Cited

U.S. PATENT DOCUMENTS

| | | | |
|---|---|---|---|
| 8,170,907 | B2 | 5/2012 | Puri et al. |
| 8,285,588 | B2 | 10/2012 | Postrel |
| 8,387,858 | B2 | 3/2013 | Bohn et al. |
| 8,407,087 | B2 | 3/2013 | Postrel |
| 8,688,525 | B2 | 4/2014 | Minde |
| 8,965,784 | B2 | 2/2015 | Postrel |
| 9,213,983 | B2 | 12/2015 | Martin, Jr. et al. |
| 9,836,759 | B2 | 12/2017 | Georgi |
| 10,430,774 | B2 | 10/2019 | Salmon et al. |
| 10,521,813 | B2 | 12/2019 | Okerlund |
| 2002/0062253 | A1 | 5/2002 | Dosh, Jr. et al. |
| 2008/0133351 | A1* | 6/2008 | White ............... G07G 1/14 705/14.27 |
| 2010/0057553 | A1* | 3/2010 | Ameiss ............ G06Q 30/02 705/14.32 |
| 2012/0271705 | A1 | 10/2012 | Postrel |
| 2013/0325579 | A1* | 12/2013 | Salmon ......... G06Q 30/0228 705/14.29 |
| 2014/0012653 | A1* | 1/2014 | Cohagan ....... G06Q 30/0233 705/14.33 |
| 2014/0207592 | A1* | 7/2014 | Kavis ............... G06Q 40/12 705/21 |
| 2015/0019317 | A1 | 1/2015 | Mitchell |
| 2015/0112790 | A1 | 4/2015 | Wolinsky et al. |
| 2016/0224997 | A1 | 8/2016 | Blackhurst et al. |
| 2016/0350789 | A1 | 12/2016 | Joglekar et al. |
| 2017/0278125 | A1 | 9/2017 | Tietzen et al. |
| 2018/0276710 | A1 | 9/2018 | Tietzen et al. |

* cited by examiner

SYSTEM AND METHOD FOR HOMOGENIZING PAYMENT TRANSACTION DATA ACQUISITION FROM DISPARATE POINTS OF SALE

CROSS-REFERENCE TO RELATED APPLICATIONS

This application claims the benefit of U.S. Provisional Application No. 63/087,046, filed Oct. 2, 2020, the entirety of which is hereby incorporated by reference. This application is related to U.S. Non-Provisional application Ser. No. 17/484,199, filed, Sep. 24, 2021.

STATEMENT REGARDING FEDERALLY SPONSORED RESEARCH

Not Applicable.

BACKGROUND

The presently disclosed systems and methods relate to incentivizing repeat transactions with merchants within a prescribed geographic area using payment processing network data.

Historically, "charge" cards or other payment cards have been used for customer transactions with merchants. The payments to merchants are initially made by the customer's bank which issued the payment card and thereby credit is provided to the customer. Over time, associations of banks and payment card issuers have grown resulting in payment networks including transaction processing companies and banks that enable cardholders to widely use charge cards or other payment cards at many merchants and regardless of the merchant's relationship or lack of relationship with the bank issuing the payment card to the customer.

Separately, merchants have an ongoing need to incentivize repeat transactions by customers. In order to incentivize repeat transactions, merchants have historically provided incentives such as coupons and rewards programs which allow customers to earn points or cash to apply towards further purchases with the same merchant. These rewards programs only allow for points/rewards to be generated through purchases from the singular merchant and are allowed to be applied to a purchase at any of the merchant's locations—regardless of geography and including the merchant's e-commerce website.

Card issuers have also implemented rewards systems separately from merchants. Typically, rewards are generated through all purchases (e.g., a "cashback" program) or purchases at all locations of specific merchants—regardless of geography. The rewards are generally in the form of cash that can be applied to the cardholder's account balance and thus are generally applicable to any purchase.

Shopping centers, malls, outlet malls, and other groupings of different merchants do not have a way of providing rewards generated from purchases at merchants within the group. Typically, shopping centers, malls, outlet malls, and other merchant groupings only act preemptively to drive sales, e.g., through the use of promotional coupons. These types of promotions are not earned through merchant transactions and do not allow for rewards to be earned amongst a variety of merchants within the mall and spent at any of the merchants within the mall.

Shopping centers, malls, outlet malls, and other groupings of merchants also typically have a lack of information about purchases made between customers and merchants. This is a result of, for example, a lack of information sharing or access between shopping centers and merchants leasing space in the shopping center. Merchants can be unwilling or unable (e.g., due to limitations in point of sale systems) to share information about purchases made by customers. Data acquisition by the shopping center (or other similarly situated entity) is also hampered by merchants using disparate and potentially non-compatible point of sale systems which track different information, use different file formats, or are otherwise not compatible with one another.

BRIEF SUMMARY

Briefly, systems and methods are disclosed herein which provide for incentivizing repeat transactions with merchants within a prescribed geographic area using payment processing network data. The disclosed systems and methods allow for groupings of merchants such as merchants within a shopping center to provide for a customer rewards system that allows earning of rewards at any of the merchants and spending of rewards at any of the merchant's physical locations within the shopping center. These systems and methods are more effective at incentivizing repeat transactions than promotional coupons and allow for rewards to be earned through purchases widely while limiting the spending of the rewards narrowly to the physical merchant locations within the shopping center (or other geographically defined area).

The systems and methods also provide for homogenizing payment transaction data acquisition from disparate points of sale. In other words, the system and methods described herein allow for collection of purchase/transaction data from merchants with different point of sale systems and homogenization of that data such that the data can be used to analyze merchants and, for example, a shopping center made up of multiple merchants, each with their own point of sale system. The collection of data and homogenization is conducted by leveraging the rewards offered to participating users in order to collect transaction data outside of the merchants' point of sale systems. This provides uniform data. The system and methods described herein also leverage the rewards system such that data regarding purchases can be acquired by a participating user's smartphone (e.g., when rewards are redeemed using an application that holds a rewards virtual payment card) when the smartphone interacts with a merchant point of sale system. In this way, participating users' smartphones operate as point of sale devices from the standpoint of data collection. And, differences in merchant point of sale systems are bypassed as the data collection is done by the application running on the device of the rewards system participating user.

DESCRIPTION OF THE DRAWINGS

In the accompanying drawings which form part of the specification.

In the figures, corresponding reference characters and symbols indicate corresponding parts throughout the several views of the drawings.

DETAILED DESCRIPTION

Figure 1:
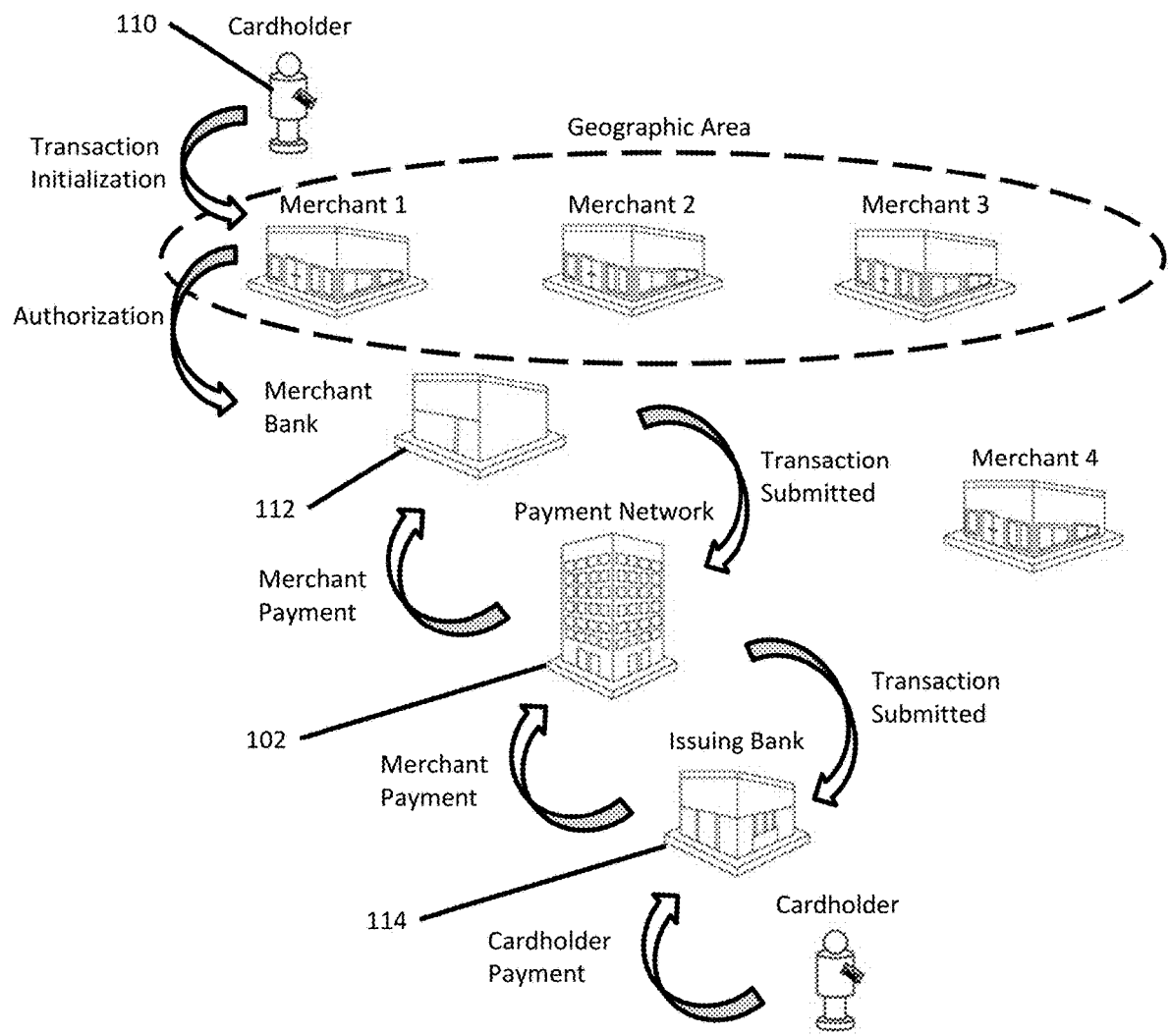
FIG. 1 is a schematic diagram illustrating an exemplary multi-party payment card system for enabling payment-by-card transactions and its relationship with different merchants in different locations.

The following detailed description illustrates systems and methods to incentivizing repeat transactions with merchants within a prescribed geographic area by way of example and not by way of limitation. The description further illustrates systems and methods to homogenize transaction data from merchants having disparate point of sale systems. The description enables one skilled in the art to make and use the incentive systems and methods, describes several embodiments, adaptations, variations, alternatives, and uses of the incentive system, including what is presently believed to be the best mode of making and using the system. Additionally, it is to be understood that the disclosed systems and methods are not limited to the details of construction and the arrangements of components set forth in the following description or illustrated in the drawings. The systems and methods disclosed are capable of other embodiments and of being practiced or being carried out in various ways. Also, it is to be understood that the phraseology and terminology used herein is for the purpose of description and should not be regarded as limiting.

Referring generally to FIGS. 1-8B, transaction data homogenization is achieved by collecting transaction data from merchants indirectly and not relying on the merchants' point of sale systems. This avoids the incompatibility of different point of sale systems. The transaction data is instead collected indirectly from a payment network and/or from a payment cardholder directly. To incentivize participation in this data collection system, the systems and methods described herein leverage a geographically limited rewards system. The geographically limited rewards system is described herein with respect to FIGS. 1-7B. The data homogenization and collection is discussed throughout and with particular reference to FIGS. 8A-8B.

Referring generally to FIGS. 1-7B, a system 100 and associated methods provide incentives to customers to shop in a prescribed geographic area. The system 100 is adapted and configured to interact with existing payment networks 102 to facilitate the incentivizing of repeat transactions within a geographic area. Generally, the system 100 interacts with the payment network 102 to identify transactions by customers participating in a rewards/incentives program. For example, the system 100 identifies transactions by participating cardholders (e.g., people making purchases with debit or credit cards issued by financial institutions to extend credit to or facilitate purchases by cardholders) by using transaction data related to the participating user's card received from the payment network 102 and identifying data associated with participating cardholders.

The system 100 compares identified transactions by participating cardholders with merchant identification data to determine if the identified transaction by the participating cardholder (e.g., enrolled cardholder and/or enrolled user) is eligible to generate rewards for the participating cardholder. The merchant identification data corresponds to merchants participating in the rewards program (e.g., enrolled merchants). This identifies transactions between enrolled users and enrolled merchants and flags these transactions as rewards eligible. The comparison between the transaction data retrieved from the transaction data aggregator 104 and the enrolled merchant identification data is carried out by an incentive management system 106.

The system 100 applies a rewards factor (e.g., 15%) to the transaction amount of the identified rewards eligible transactions to determine a rewards amount for each transaction occurring between enrolled users and enrolled merchants. Rewards are calculated by the incentive management system 106. The system 100 transmits an instruction to a virtual card issuer 108 to apply the rewards amount to an account associated with the enrolled user who transacted with the enrolled merchant in the transaction that generated the rewards amount. The virtual card issuer manages the account and ties it to a virtual payment card that allows for the rewards to spent as cash provided that a transaction seeking to use rewards is authorized to proceed.

The system 100 authorizes or refuses to authorize transactions seeking to use rewards based at least in part on the geographic location in which the transaction to be authorized or denied is going to take place. This allows the system 100 to limit rewards spending to a specific geographic area, for example a shopping mall. In this way, the system 100 incentivizes repeat transactions with merchants within a limited geographic area, e.g., the shopping mall. The system 100 thereby drives traffic to physical shopping locations.

This system 100 thereby provides advantages in that repeat transactions with merchants within a specific geographic area are incentivized. The system 100 also advantageously allows earned rewards to be spent just like cash (although limited to a geographic area and/or participating merchants within the limited geographic area). This avoids the disadvantages of coupons which require that the coupons to be used in a very limited circumstance (e.g., with a specific merchant, with a specific product, with a minimum purchase, etc.) and that the coupons are unearned. In other words, traditional coupon rewards are limited in their ability to be applied and do not form a recurring relationship with merchants (specific merchants or general merchants within a geographic area).

The system 100 also provides an advantage over brand loyalty cards/rewards programs. Brand loyalty programs are more restrictive and only allow rewards to spend on further purchases with the same merchant/brand. These programs also do not typically have a geographic restriction on the spending of points. Such programs do not benefit a retail ecosystem such as a shopping mall but rather only benefit a single brand. Brand loyalty programs also do not allow for information sharing across brands or between brands/merchants and lessors (e.g., shopping mall operators). The system 100 provides for incentives for users to shop at a variety of brands with rewards earned from purchase from any participating merchant. The geographic limitation on spending of rewards and the cash-like nature allows the incentive to benefit a plurality of merchants and the geographic region.

The system 100 further provides an advantage over cashback style payment cards. Such payment cards have a disadvantage in that they allow rewards to be earned by any purchase with any merchant. This does not incentivize an ongoing relationship with a merchant or set of merchants. Although some cashback payment cards provide additional "bonus" rewards for shopping with a specific merchant or merchant category, these programs treat some merchants preferentially. The system 100 incentivizes merchant participation by not treating any participating merchant preferentially. Further, the system 100 limits rewards to rewards eligible transactions which occur between a user and an enrolled merchant. This incentivizes an ongoing relationship with the merchant which benefits the merchant more than a cashback payment card. In other words, the cashback payment card program benefits the payment card issuer by attracting further payment cardholders while the system 100 benefits merchants by incentivizing repeat purchases by users. A cashback payment card system further has a disadvantage in that the cashback can be spent anywhere and on any purchase. This does not allow for incentivizing repeat transactions within a specific geographic area. The system 100 does provide this advantage.

Referring now to FIG. 1, a payment network 102 and its relationship to geographically similar and geographically diffuse merchants is illustrated. In a traditional purchase with a payment card, a cardholder 110 presents the payment card to a merchant (e.g., merchant 1) at the merchant's point of sale device. This initializes the transaction. For example, the cardholder 110 or a merchant employee swipes the payment card such that information from the payment card is read by the merchant point of sale device. The merchant (e.g., merchant 1) seeks authorization for the transaction to proceed by transmitting an authorization request to the merchant's bank 112. The authorization request includes identification information—e.g., cardholder name, cardholder address, payment card number, payment card account number, card verification value (CVV) number, payment card expiration date, merchant name, merchant address, merchant identification (MID), terminal identification (TID), etc.—and transaction information—e.g., transaction amount, transaction time, etc.

The merchant bank 112 submits the transaction to the payment network 102 for authorization. The payment network 102 facilitates routing of the transaction authorization request such that the transaction authorization request reaches the appropriate issuing bank 114. The payment network 102 facilitates communication between merchants and payment card issuing banks. For example, the payment network 102 can be a network such as Visa, MasterCard, Discover, American Express, etc. The transaction authorization request is a digital message containing transaction information such as a payment cardholder identification, a merchant identification, a transaction amount, an authorization flag Boolean that can be set to true or false depending on whether the transaction has been authorized, a date/time of the transaction, an issuing bank identification or the like, and the digital message is formatted to be transmitted and handled using the systems and processes of the payment network 102 and the entities interacting with one another through the payment network 102.

The issuing bank 114 determines if the transaction authorization request should be approved or denied. For example, the issuing bank 114 can, as part of this determination, query the account of the cardholder 110 to determine if there is sufficient funds or credit for the transaction amount of the transaction for which authorization is sought, make a determination as to the probability of fraud, etc. This involves comparing information found within the received transaction authorization request to information contained within the issuing bank's database with respect to the payment cardholder identified in the transaction authorization request. For example, the issuing bank's computer systems may read the transaction amount from the authorization request and compare this to a balance held in the database records to ensure that adequate funds are present. In response to determining that the transaction is authorized, the issuing bank 114 will forward a payment, from the cardholder's account or with credit and charge the cardholder's account, to the payment network 102 such that the payment network 102 can route the payment to the merchant (e.g., merchant 1). The payment network 102, upon receipt of the payment from the issuing bank 114, forwards the payment to the merchant's bank 112 such that the transaction is settled. The payment is transmitted as a digital message formatted to be handled by the payment network 102 and associated components/actors. For example, the digital message in this case may include an amount equal to that of the transaction amount, a merchant bank identification, a merchant account identification, an instruction to credit the identified merchant account with the amount, or the like. Upon transmitting such a payment instruction, the issuing bank can debit the account of the payment cardholder identified in the transaction authorization request message.

If the issuing bank 114 determines that the transaction of the authorization request is not authorized (e.g., due to lack of funds, suspected fraud, etc.), then the issuing bank 114 transmits to the payment network 102 a refusal to authorize the transaction. The payment network 102 forwards the refusal to authorize to the merchant's bank 112. The merchant's bank 112 then forwards the refusal to the merchant (e.g., merchant 1's point of sale device). The refusal takes the form of a digital message of the type generally described herein and throughout. The message includes, for example, information identifying the transaction that has been refused authorization (e.g., transaction identification number, merchant identification, cardholder identification), an indication that the transaction authorization request has been refused (e.g., a Boolean flag set to false), text providing an explanation for the refusal (e.g., insufficient funds), or the like.

The payment network 102 similarly handles transactions between a plurality of payment cardholders and a plurality of merchants (e.g., merchant 2, merchant 3, merchant 4, etc.). The payment network 102 is adapted and configured to handle payment card transactions generally and regardless of the geography of merchants and any association of merchants. For example, if merchants 1-3 are in a shopping mall and merchant 4 is remote, the payment network 102 handles transaction involving all four merchants identically. Therefore, the payment network 102, alone, cannot differentiate based on geography for the purposes of the providing a rewards program with geographical restricted redemption of the type described herein with respect to system 100. However, the payment network 102 can be used, in addition to other systems and components, by the system 100 in order to facilitate the functions of the payment network 102 described herein.

Figure 2:
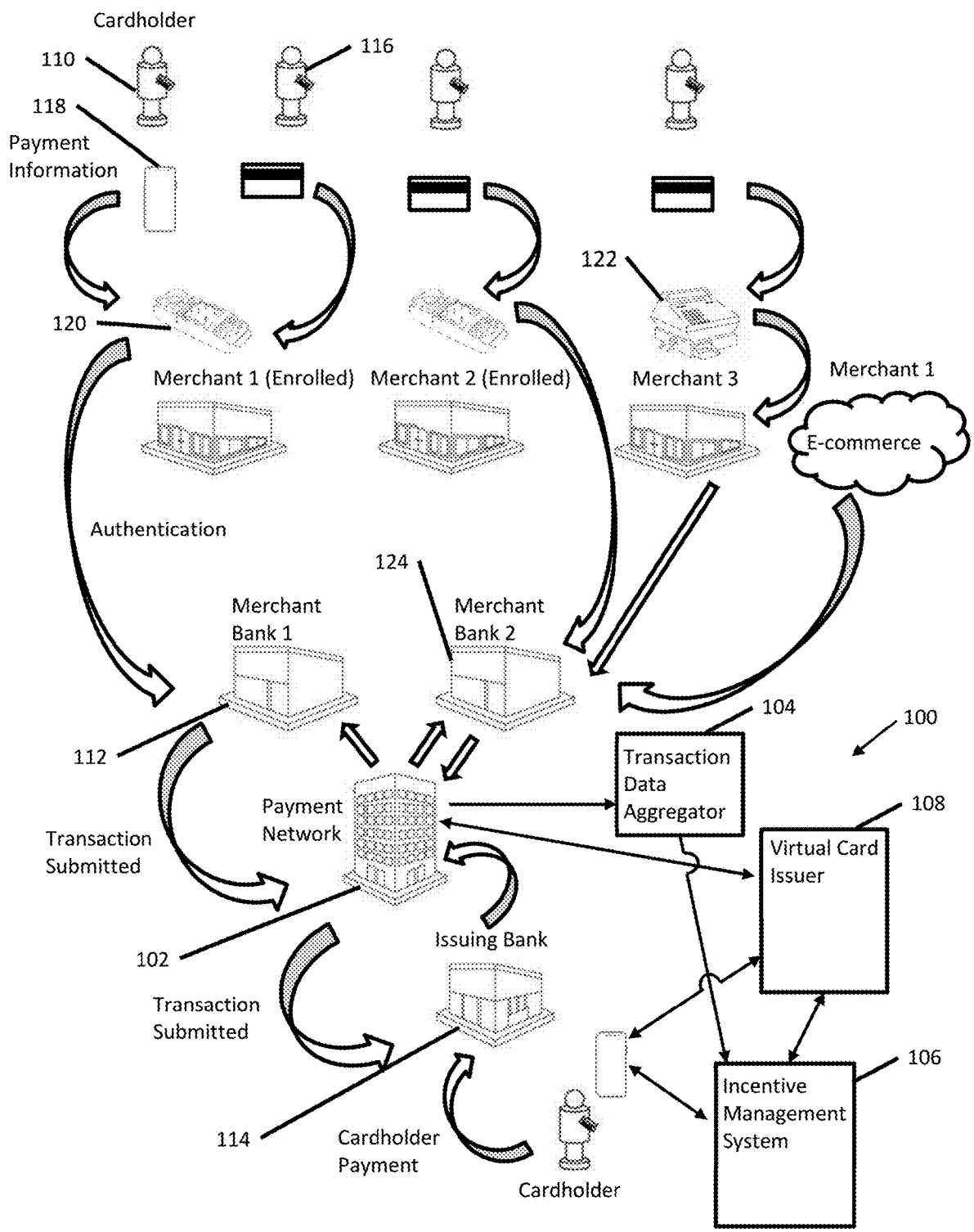
FIG. 2 is a schematic diagram illustrating the relationship between a multi-party payment card system and systems that enable the incentivizing of repeat transactions with merchants within a prescribed geographic area using payment processing network data.

Referring now to FIG. 2, system 100 and its relationship to cardholders, merchants, the payment network 102, and others is illustrated according to one embodiment. Generally, for a cardholder 110 who is enrolled with the incentive management system 106, the system 100 operates as follows. Enrollment, specifically, is described herein later and with respect to FIGS. 4A-4B. Cardholder 110 earns rewards by making purchases with a payment card at enrolled merchants, in this example merchants 1 and 2. Enrollment of merchants is described with greater detail herein later and with respect to FIGS. 5A-5B. The process of cardholder 110 making a purchase with a payment card operates as previously described with respect to any general transaction. The payment network 102 handles the transaction by moving transaction data between merchant 1, the merchant bank 112, and the issuing bank 114 (e.g., the bank issuing cardholder's 110 payment card).

Transaction data associated with the transaction is captured by the transaction data aggregator 104 which is in communication with the payment network 102. Acquisition of the transaction data can occur in a variety of ways. In one embodiment, the transaction data aggregator 104 captures transaction data for all transactions handled by the payment network 102 (e.g., as transaction authorization requests and settlements are transmitted through the payment network 102, the transaction data aggregator 104 temporarily receives the associated messages or copies of the associated messages and writes the embedded information to a database operated by the transaction data aggregator). In an alternative embodiment, the transaction data aggregator 104 monitors all transactions but captures and stores transaction data only for enrolled cardholders (e.g., cardholder 110). For example, the transaction data aggregator can maintain a database of cardholder identification data for enrolled cardholders 110 and query each transaction monitored (e.g., each message or a copy of each message handled by the payment network 102) to determine if the queried transaction includes cardholder identification data that matches cardholder identification data stored in the database of enrolled cardholders. In a further alternative, the transaction data aggregator periodically (e.g., daily, hourly, every minute, etc.) queries the payment network 102, which maintains a database of transactions (containing the information embedded in messages), for transactions which include cardholder identification data matching cardholder identification data stored in the database of enrolled cardholders by the transaction data aggregator 104. In response, the transaction data aggregator receives all transactions from the payment network 102 which include cardholder identification matching that of enrolled cardholders.

Preferably, the cardholder identification data used to track enrolled cardholders 110/users and used to identify transactions made by the enrolled cardholders 110 is an account number or payment card number corresponding to a payment card held by the enrolled cardholder 110. In other embodiments, the cardholder identification data can be one or more of a cardholder name, cardholder address, or other identifying information.

The transaction data aggregator 104 identifies and retrieves these transactions based on an instruction received from the incentive management system 106 (e.g., the instruction being a digital message including an executable request for database elements related to a transaction identification, payment cardholder identification, merchant identification, or the like). For example, the incentive management system 106 transmits a request for transaction data associated with at least one enrolled user. In response to the request, the transaction data aggregator 104 acquires and returns the relevant transactions (e.g., by executing program instructions contained with request digital message identifying the database record by a merchant/payment cardholder identification and requesting associated database entries to be read from the database and returned). In some embodiments, the incentive management system 106 does not communicate directly with the payment network 102. This has the advantage of allowing the transaction data aggregator 104 and the incentive management system 106 to operate in parallel.

Once the incentive management system 106 receives transactions involving the enrolled cardholder 110, the incentive management system 106 identifies transactions that are eligible for rewards. To identify rewards eligible transactions, the incentive management system 106 checks each received transaction by an enrolled cardholder 110 to determine if the transaction was with an enrolled merchant (e.g., this check is performed by querying a database of the received transactions using a database or matrix of merchant identifications and selecting, flagging, copying, or the like the database entries with enrolled merchant identifications). For example, the incentive management system 106 identifies merchant identification data in the transaction known to involve an enrolled cardholder 110. The identified merchant identification data is compared (e.g., using database comparison techniques) to a database of merchant identification data for enrolled merchants. If there is a match, the transaction being analyzed is flagged as rewards eligible. If the merchant identification data found in the transaction is not found in the database of enrolled merchants, then the incentive management system 106 determines that the transaction is not rewards eligible. Transactions that are rewards eligible can be put into a database of rewards eligible transactions or can be handled on an individual basis as they are identified (e.g., database entries that are identified as including enrolled merchant identifications are copied to extract all related database entries and the entries are written to a new database such as the database of rewards eligible transactions).

The incentive management system 106, in conjunction with the transaction data aggregator 104, captures transactions with an enrolled merchants e-commerce website in the same manner and evaluates if the transactions are rewards eligible in the same manner. This allows for the incentive management system 106 to provide rewards made for online purchases between enrolled cardholders and enrolled merchants.

Using the rewards eligible transactions identified by the incentive management system 106, the incentive management system 106 calculates a rewards amount. To do this, the incentive management system 106 identifies a transaction amount in the transaction data associated with the rewards eligible transaction (e.g., by querying the database of rewards eligible transactions for each entry to identify the amount element of the entry). Using the transaction amount, the incentive management system 106 applies a rewards factor to determine the rewards amount. For example, the rewards factor can be between 0.1 and 0.2, inclusive, and can be more preferably 0.15. It has been found that 0.15 is an optimum rewards rate to increase participating by both cardholders and merchants. The determined rewards amount is either used as it is calculated or placed in or added to a database that includes the associated enrolled cardholder identification data. Again, these steps can be performed on a transaction by transaction basis as rewards eligible transactions are identified as described above or can be handled in a batch process if the identified rewards eligible transactions are placed into a database of rewards eligible transactions.

After determining an awards amount for a transaction or a set of transactions (the amounts placed in a database), the incentive management system 106 prepares an instruction and sends the instruction to the virtual card issuer 108 to apply the rewards amount to an account for the enrolled cardholder who participated in the transaction for which rewards were calculated. The instruction is a digital message including the rewards amount and identifying the associated enrolled payment cardholder/account to be credited, and includes a program instruction to be executed by the virtual card issuer to credit the account. The instruction includes cardholder identification information and the rewards amount such that the virtual card issuer 108 can increase an account balance of the enrolled cardholder by the rewards amount. The account maintained by the virtual card issuer 108 corresponds to a virtual payment card usable by the enrolled cardholder. Again, the balances can be updated serially or in a batch process.

For transactions involving non-enrolled cardholders (e.g., cardholder 116), the transaction data aggregator 104 does not capture these transactions, even if the transaction involves an enrolled merchant.

It should be understood that the identification of rewards eligible transactions between enrolled merchants and enrolled cardholders 110 can be identified using any suitable order of steps or techniques. For example, in an alternative embodiment, the same steps are performed but in reverse order. The transaction data aggregator 104 identifies transactions involving enrolled merchants by interacting with the payment network 102 in the manner described above with respect to the enrolled cardholder identification data (e.g., querying the payment network 102 to identify transaction including enrolled merchant identification data such as a merchant identification, terminal identification, merchant name, or the like. Those transactions received from the payment network by the transaction data aggregator 104 and forwarded to the incentive management system 106 are then compared against a database of enrolled cardholders 110 to identify transactions between the two enrolled parties. This is done in the same manner described above with respect to comparing the received transaction to the database of enrolled merchants. For transactions involving merchants not enrolled (e.g., merchant 3), the transaction is not captured by the transaction data aggregator even if the transaction is between the non-enrolled merchant (e.g., merchant 3) and an enrolled cardholder.

It should further be understood that the operations described above can be carried out using databases or any other suitable data structure and/or data processing technique.

Earning rewards and processes performed by the system 100 are described later herein with additional detail and with respect to FIGS. 6A-6B.

Still referring to FIG. 2, an enrolled cardholder 110 can spend accumulated rewards using a virtual payment card issued and maintained by the virtual card issuer 108. The account is established by the virtual card issuer 108 in response to an instruction from the incentive management system 106 when the incentive management system 106 enrolls a cardholder 110. The virtual payment card is held within a virtual wallet and/or application running on the enrolled cardholder's device 118 (e.g., a smartphone). The application can be downloaded by the cardholder 110 as a portion of the enrollment process. For example, and without limitation, the enrollment can be requested through the application with the application communicating with the incentive management system 106.

When making a purchase with rewards, the enrolled cardholder 110 presents the virtual payment card at the merchant's point of sale device 120. In the case where the merchant is not an enrolled merchant (e.g., merchant 3), the non-enrolled merchant's point of sale device 122 transmits a transaction authorization request through the merchant bank 124 (e.g., merchant bank 2) and payment network 102 to the issuer of the virtual payment—the virtual card issuer 108. In this manner, the transaction is handled like any typical payment card transaction. Upon receiving the transaction authorization request, the virtual card issuer 108 forwards the request to the incentive management system 106 for processing. In alternative embodiments, the virtual card issuer 108 performs the transaction authorization functions described herein as performed by the incentive management system 106.

When the incentive management system 106 receives the transaction authorization request, the incentive management system 106 first determines if the transaction that is the subject of the authorization request is with an enrolled merchant. For example, the incentive managements system 106 retrieves from the authorization request a merchant identification and compares the merchant identification to a database of enrolled merchant identifications. If the merchant identification of the transaction authorization request is not found in the database of enrolled merchants then the incentive management system 106 does not authorize the transaction. The refusal is transmitted to the virtual card issuer 108 which then communicates the refusal to authorize back through the payment network 102 and to the merchant point of sale device 122.

Moving to a second scenario, if the enrolled cardholder 110 is transacting with an enrolled merchant, the incentive management system 106 determines that the merchant identification of the transaction authorization request matches a merchant identification of an enrolled merchant held within a database of enrolled merchant identification information. The incentive management system 106 also controls authorizations of transaction requests involving the virtual payment card in order to restrict spending of rewards, by the virtual payment card, to a specific geographic area. In one embodiment, this is achieved by controlling the enrollment of merchants such that only merchants within the specific geographic area are enrolled. In such an embodiment, once a match is found between the merchant identification of the transaction authorization request and a merchant identification in the database of enrolled merchants, the incentive management system 106 causes the transaction to be authorized. The transaction necessarily being within the specific geographic area. The incentive management system 106 causes the transaction to be authorized by transmitting an instruction to the virtual card issuer 108 to transmit an authorization through the payment network 102 and the merchant bank 112 (e.g., merchant bank 1) and to the merchant point of sale device 120.

In an alternative embodiment, the incentive management system 106 determines if the transaction of the transaction authorization request is occurring within the prescribed geographic area based on a portion of a merchant address included within the transaction authorization request. The incentive management system 106 compares a portion of a merchant address included within the transaction authorization request to a portion of an address defining the geographic area within which rewards can be spent. The portion of the address defining the geographic area is predefined and stored within the incentive management system 106. For example, the portion of the address at issue can be a street name, a zip code, a county, a city, a census tract, or a state.

In a further alternative embodiment, the incentive management system interacts with the enrolled cardholder's device 118 and the application running on the device to acquire position data that is used to determine if the transaction that is the subject of the authorization request is occurring within the prescribed geographic area. In response to receiving the transaction authorization request, the incentive management system 106 transmits a request to an enrolled payment cardholder device 118 for global positioning system data. The request is formatted to cause the application running on the enrolled payment cardholder device 118 to retrieve global positioning system data and transmit the global positioning system data to the incentive management system 106. The incentive management system 106 receives, from the enrolled payment cardholder device 118, global positioning system data and associating that global positioning system data with the transaction authorization request. The incentive management system 106 compares the global positioning system data associated with the transaction authorization request to a geofence boundary defining the prescribed geographic area in which rewards can be spent at enrolled merchants. The incentive management system 106 further determines that the transaction of the transaction authorization request occurred within the prescribed geographic area when the global positioning system data associated with the transaction authorization request corresponds to a location within the geofence boundary.

Regarding redemption of rewards, it should be understood that in some embodiments, a transaction will be authorized that allows for partial payment with rewards via the virtual payment card. If the balance in the account of the virtual payment card does not exceed the transaction amount, the transaction can be reformatted to apply the entire rewards balance with the remainder being paid by the enrolled cardholder through a separate transaction (e.g., using cash or another payment card).

Regardless of the process used to determine if the transaction of the transaction authorization request is occurring within the prescribed geographic area, the prescribed geographic area can be or correspond to a shopping mall, outlet mall, community improvement district, tax increment financing district, or commercial district. The geographic location can also correspond to a single retailer, the single retailer offering a plurality of differently branded products for sale. In such a case and/or in other cases, the merchant is a seller of a specific brand of product. For example, the merchant can be a department store, grocery store, restaurant, clothing retailer, accessory retailer, pharmacy, technology retailer, pet retailer, toy retailer, general merchandise retailer, or service provider.

Figure 3:
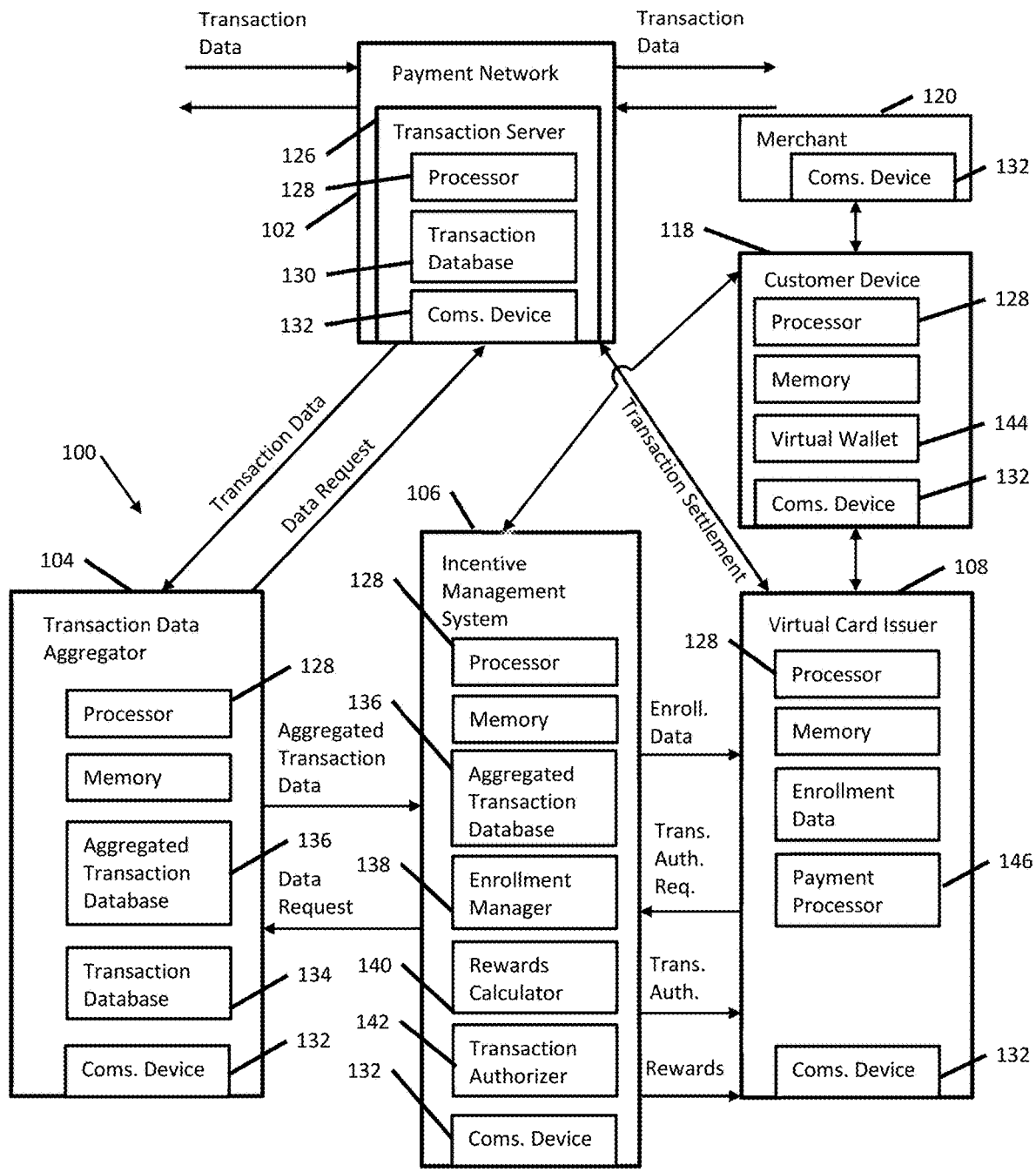
FIG. 3 is a simplified block diagram illustrating the relationship between the multi-party payment system network, a transaction data aggregator, incentive management system, virtual card issuer, customer device, and merchant that enable the incentivizing of repeat transactions by customers at specific merchants.

Referring now to FIG. 3, the system 100 is shown in greater detail in relationship to the payment network 102. The payment network 102 (e.g., payment processor, payment processing network, etc.) handles transaction data for transaction authorizations and transaction settlements of the type and in the manner described herein. To process authorizations and transaction, the payment network 102 includes at least one transaction server 126. In some cases, the payment network 102 includes a plurality of transaction servers 126 that can be geographically dislocated. Each transaction server 126 includes a processor 128, a transaction database 130, and a communications device 132. These components, along with other components not shown (e.g., memory, a power source, etc.), carry out the functions of the payment network and transaction server described herein. The processor 128 can be a special purpose or a general purpose processor device. As will be appreciated by persons skilled in the relevant art, processor 128 can also be a single processor in a multi-core/multiprocessor system, such system operating alone, or in a cluster of computing devices operating in a cluster or server farm. Processor device 128 is connected to the communications device 132 and the transaction database 130 with, for example, a bus, message queue, network, or multi-core message-passing scheme. The transaction server 126 can further include memory to which one or more other components are connected for communication. For example, the transaction server 126 can include random access memory (RAM), a hard disk drive, removable storage drive, a floppy disk drive, a magnetic tape drive, an optical disk drive, a flash memory, or the like. Programs that facilitate the functions described herein can be stored in memory and executed by the processor 128.

The transaction database 130 is stored in memory of the transaction server 126 or a similar component within the payment network 102. The transaction database 130 stores transaction information for a plurality of transactions and can store the transaction transitorily, for a period of time, or permanently. Transaction information can include any of the information described herein and or other information. For example, and without limitation, transaction information can include cardholder identification information (e.g., name, address, telephone number, payment card number, etc.), an account number corresponding to the payment card, a card verification value, a payment card expiration date, merchant identification information (e.g., merchant identification number, name, address, telephone number, etc.), a terminal identification number corresponding to a point of sale device, transaction amount, the product being purchased (e.g., a stock keeping unit code), the date, the time, the location (e.g., merchant address), and or other transaction information.

The communications device 132 is in communication internally with the processor 128, transaction database 130, memory, and/or other components of the transaction server 126. The communications device 132 allows for communication with external devices (e.g., merchant bank servers, issuing bank servers, merchant point of sale devices, the transaction data aggregator 104, the incentive management system 106, virtual card issuer 108, etc.). The communications device 132 can be or include a modem, a network interface (such as an Ethernet card), a communications port, a PCMCIA slot and card, or the like. Information communicated through the communications device 132 can be in the form of signals, which can be electronic, electromagnetic, optical, or other signals capable of being transmitted/received by a communications device.

The transaction data aggregator 104 likewise includes a processor 128, memory, and communications device 132 of the type previously described with respect to the transaction server 126. The transaction data aggregator 104 also includes a transaction database 134 that includes all or a subset of the transaction stored in the transaction database 130 of the transaction server 126. Additionally, or alternatively, the transaction data aggregator 104 can include an aggregator transaction database 136. In one embodiment, the transaction data aggregator sends a data request to the payment network, using the associated communications devices 132, with the data request requesting all transaction data. For example, the data request can be a message formatted to be handled by the payment network using an application programming interface or the like and include a data request element, request target element, information return destination element, or other like information that indicates what the request is, how to handle the request, and to where and/or in what format to return data that is the subject of the request. In such an embodiment, the transaction data is then stored, at least temporarily, in the transaction database 134. For example, the payment network 102 upon receipt of the data request executes the request using the elements of the request and transmits the requested information to the transaction data aggregator 104, with the transaction aggregator writing the received transaction data to the transaction database 134 as it is received. The transactions can be narrowed to create the aggregated transaction database 134 such that the aggregated transaction database 134 includes only those transactions involving enrolled cardholders (or in alternative embodiments enrolled merchants).

In an alternative embodiment, the data request requests transaction data involving only enrolled cardholders (or in alternative embodiments enrolled merchants) and the payment network 102 parses the request. In such a case the returned transaction data is stored directly in the aggregated transaction database 134. The data request in such cases includes cardholder (or in alternative embodiments merchant) identification information such that the relevant transactions can be identified. Such information typically includes at least an identification number (e.g., payment card number, merchant identification number, etc.) but can include any of the identification information described herein.

The transaction data aggregator 104 is adapted and configured to receive (e.g., via the communications device 132) a data request from the incentive management system 106. The data request is for transactions made by enrolled payment cardholders 110 (or in alternative embodiments transaction made by enrolled merchants). The data request includes enrolled payment cardholder (e.g., enrolled user/enrolled customer) identification data of the type described herein (e.g., payment card number). The incentive management system 106 receives, in response to the data request, aggregated transaction data from the transaction data aggregator 104. The received transaction data is added to an aggregated transaction database 134 stored in the incentive management system 106. The incentive management system 106 queries the aggregated transaction database 134 with enrolled merchant identifications stored in an enrolment manager 138. This identifies rewards eligible transactions that have occurred between enrolled payment cardholders and enrolled merchants. In other embodiments and as previously described, the procedure can be reversed in that the incentive management system 106 receives transactions with enrolled merchant identification data from the transaction data aggregator 104 and cross checks the transactions with enrolled cardholder identification data stored in the enrollment manager 138 to identify rewards eligible transactions.

The enrollment manager communicates with at least a customer device 118 to enroll customers/payment cardholders. The enrollment manager also includes identification information corresponding to enrolled merchants.

Once rewards eligible transactions are identified, the incentive management system 106 calculates rewards for each rewards eligible transaction using a rewards calculator 140. The rewards calculator 140 calculates rewards for each eligible transaction using the methods described herein. For example, the rewards calculator 140 is a program, function, sub-routine, or the like and applies a rewards factor to the transaction amount for each rewards eligible transaction held in a database of such transactions. The rewards amount is appended as an additional datum for each transaction held within the rewards eligible transaction database. Alternatively, a new database is created that includes at least the rewards amount and enrolled payment cardholder identification information.

The incentive management system 106 communicates earned rewards to the virtual card issuer 108 so that the virtual card issuer can update an account balance associated with the account of the enrolled payment cardholder. This is communicated to the virtual card issuer 108 by an instruction sent from the incentive management system. The instruction causes the account of the enrolled payment cardholder to be credited by the rewards amount. The instruction includes enrollment data such as enrolled cardholder identification information. This information is used by the virtual card issuer to setup and identify accounts for virtual payment cards associated with individual enrolled payment cardholders (e.g., users).

The incentive management system 106 also communicates the earned rewards to the enrolled customer device 118 to cause an application running thereon to reflect the updated account balance. The communication causes the application to update account balances associated with the virtual payment card held within the customer device's 118 virtual wallet 144. This interaction can take the form a push notification sent by the incentive management system 106 to the enrolled payment cardholder device 118 such that an application handles the push notification and updates the account balance visible within the application/virtual wallet 144. In alternative embodiments, this is handled by the virtual card issuer 108 when it receives the instruction to update the balance.

The incentive management system 106 can also communicate directly with an enrolled payment cardholder's device 118 (e.g., customer device) to update an account balance within a virtual wallet 144, inform the enrolled payment cardholder that rewards have been earned, or send or request other information. For example, the incentive management system 106 can request cardholder identification information as part of an enrollment process. In some embodiments, the incentive management system 106 also interacts with the customer device as relates to gathering information about the payment cardholder and presenting offers/promotions, or the like. For example, the incentive management system 106 requests inputs for a matching algorithm/prediction algorithm to associate an enrolled payment cardholder with potential/likely purchases that the enrolled payment cardholder can make if informed of them. Such inputs can include demographic information (e.g., age, race, gender, sex, marital status, height, weight, shoe size, annual income, address, etc.), brand interest/preference information (e.g., brands of interest, previously purchased brands, etc.), category interest/preference information (e.g., interest in different types of products, interest in price point of products, etc.), and other information.

When transactions using rewards are initiated by an enrolled payment cardholder, the transaction authorization request is initially communicated to the virtual card issuer 108. The virtual card issuer 108 transmits the transaction authorization request to the incentive management system 106 which handles the transaction authorization request using a transaction authorizer 142. The transaction authorizer 142 is a program, function, sub-routine, or the like and determines whether to authorize the transaction that is the subject of the transaction authorization request (e.g., by determining if the transaction is with an enrolled merchant and is occurring within a prescribed geographic area). The incentive management system 106 transmits the transaction authorization or refusal to authorize to the virtual card issuer 108.

The incentive management system 106 does not communicate directly with the payment network 102 including the transaction server 126. As previously explained, this provides several advantages including allowing the components of the system 100 to operate in parallel thus increasing efficiency.

The virtual card issuer 108 communicates with the incentive management system 106 to get transaction authorization requests authorized or denied. The virtual card issuer 108 also communicates with the incentive management system 106 to receive enrollment data corresponding to enrolled payment cardholders. This allows for the virtual card issuer 108 to establish (i.e., issue) virtual payment cards and associated accounts such that earned rewards can be stored and spent by enrolled payment cardholders. The virtual card issuer 108 also communicates with the incentive management system 106 to receive information regarding rewards earned by the enrolled payment cardholder. In response to receiving an instruction to apply rewards, the virtual card issuer uses a payment processor 146 (e.g., a program, function, sub-routine, or the like) to credit the account of the enrolled payment cardholder identified in the instruction. The virtual card issuer 108 also interacts with the payment network 102 (e.g., transaction server 126) and the incentive management system 106 to receive transaction authorization requests and authorization or decline instructions from the incentive management system 106. Likewise, the virtual card issuer 108 operates as an issuing bank to settle authorized transactions and communicate when transaction authorization requests or denied. The virtual card issuer 108 can also communicate rewards account balances to the incentive management system 106 for authorization determinations or make that determination itself as part of the transaction authorization process (e.g., does the enrolled payment cardholder have a sufficient balance to cover the transaction amount). These and/or other functions are accomplished using the payment processor 146, processor 128, communications device 132, memory, or other components/processes. In some embodiments, the virtual card issuer 108, as the issuer of the virtual payment card, does not make transaction authorization determinations of any type. Instead those determinations are made by the incentive management system 106 as described herein.

In some embodiments, the virtual card issuer 108 also interacts with the customer device 118 to update account balances associated with the virtual payment card held within the customer device's 118 virtual wallet 144. This interaction can take the form of a push notification sent by the virtual card issuer 108 to the enrolled payment cardholder device 118 such that an application handles the push notification and updates the account balance visible within the application/virtual wallet 144. In alternative embodiments, these functions are handled by the incentive management system 106 as described herein. In alternative embodiments, the virtual card issuer 108 does not communicate directly with the customer device 118 (the communication being instead handled by the incentive management system 106 and payment network 102).

The customer device 118 is any device suitable for running an application of the type described herein and communicating with a merchant point of sale device 120. The customer device can be, for example, a smartphone device having a processor, memory, communications device 132, and be capable of maintaining a virtual wallet 144. The customer device 118 communicates at least with the incentive management system 106 and the merchant point of sale device 120. The customer device 118 communicates with the merchant point of sale device 118 (e.g., using near field communication, Bluetooth communication, Wi-Fi communication or the like) to provide at least a virtual payment card account number associated with the enrolled payment cardholder and the account associated with the enrolled payment cardholder's rewards. This allows a transaction to be initiated. In response, the merchant point of sale device 118 transmits an authorization request through the payment network 102 and to the virtual card issuer 108.

It should be understood that the communications using the communications devices 132 can be made using any suitable technique to facilitate interoperability of the devices/systems/servers that are communicating. For example, the data request can be formatted to take advantage of an application programming interface (API) or other system that allows for the devices to communicate with one another. In this manner, the format of instructions, requests, returned information, and the like can be uniform or cross-operable between different components of the system.

Figure 4A:
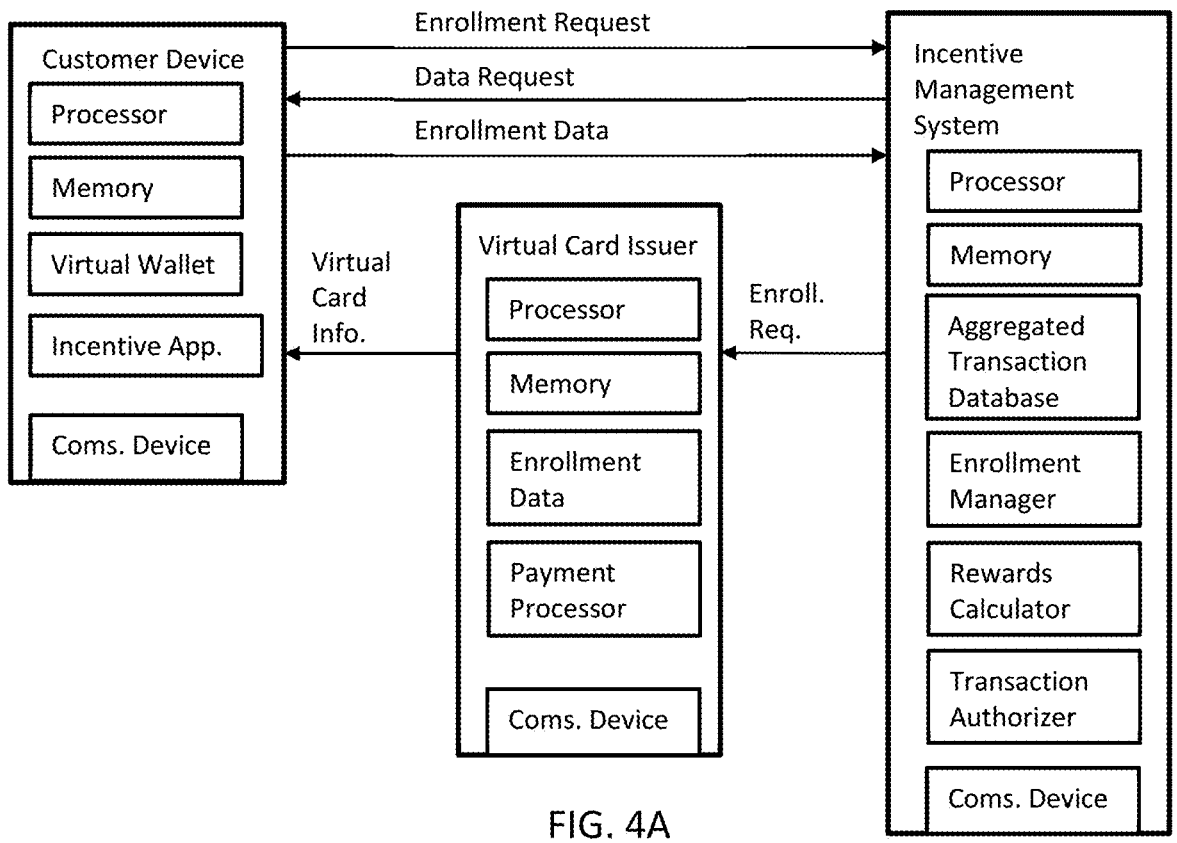
FIG. 4A is a simplified block diagram showing the communication between a customer device, incentive management system, and virtual card issuer as pertains to enrolling a customer such that the customer can earn and spend rewards.
Figure 4B:
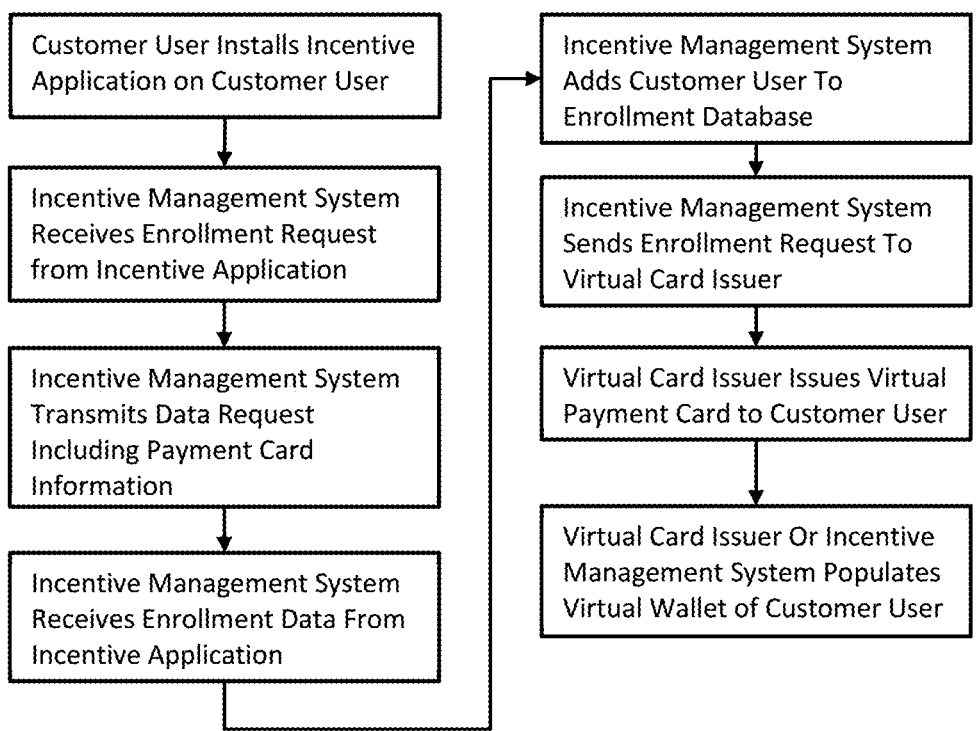
FIG. 4B is a flow chart showing steps of a method of enrolling a customer such that the customer can earn and spend rewards.

Referring now specifically to FIGS. 4A-4B, the process of enrolling a payment cardholder is shown in more detail and according to one embodiment. FIG. 4A shows a schematic of the data flow between the customer device 118, incentive management system 106, and virtual card issuer 108 in the context of enrolling the payment cardholder. FIG. 4B shows a flowchart illustrates the steps taken to enroll the payment cardholder.

Figure 5A:
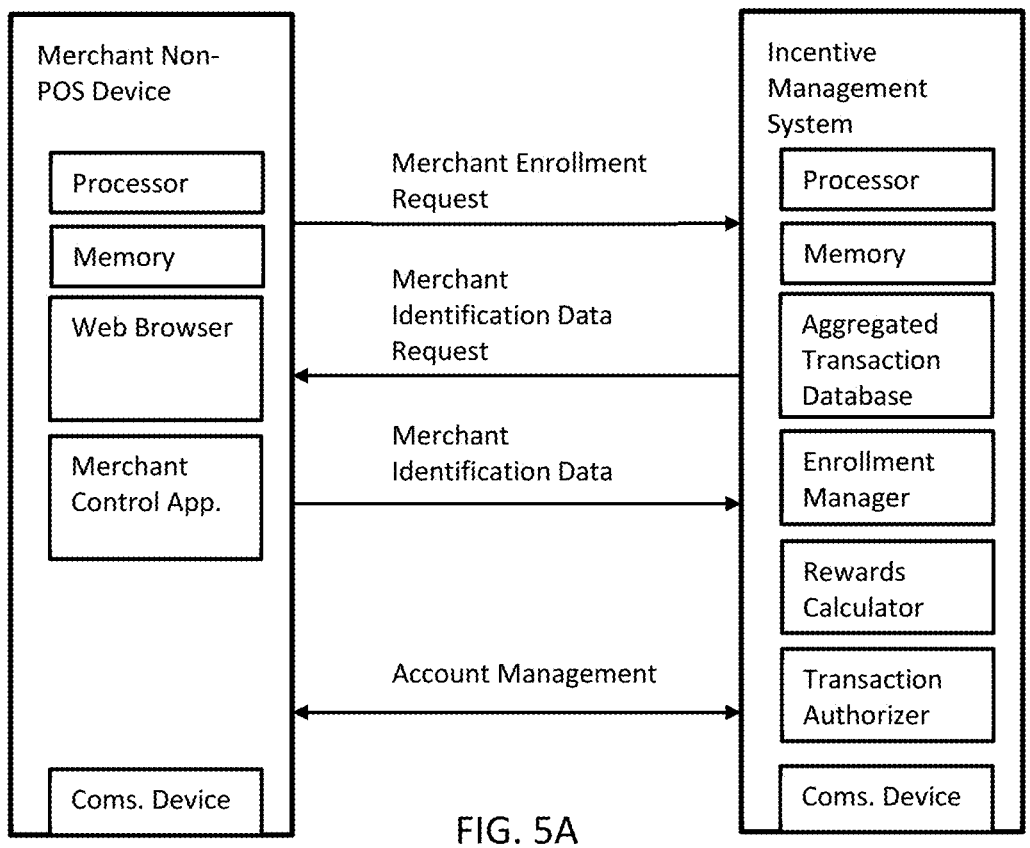
FIG. 5A is a simplified block diagram showing the communication between a merchant device and the incentive management system as pertains to enrolling the merchant such that the merchant can provide customer rewards and receive payments by customer rewards.
Figure 5B:
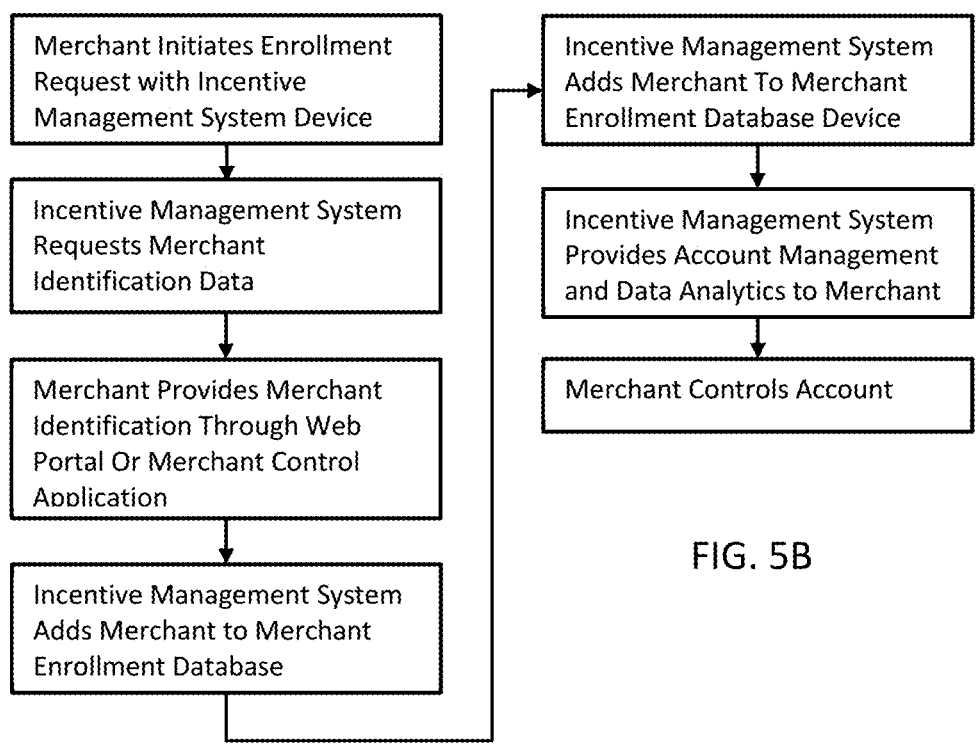
FIG. 5B is a flow chart showing steps of a method of enrolling a merchant such that the merchant can provide rewards and receive rewards payments.

Referring now specifically to FIGS. 5A-5B, the process of enrolling a merchant is shown in more detail and according to one embodiment. FIG. 5A shows a schematic of the data flow between a merchant non-point of sale device and the incentive management system 106 in the context of enrolling the merchant. FIG. 5B shows a flowchart illustrates the steps taken to enroll the merchant.

Figure 6A:
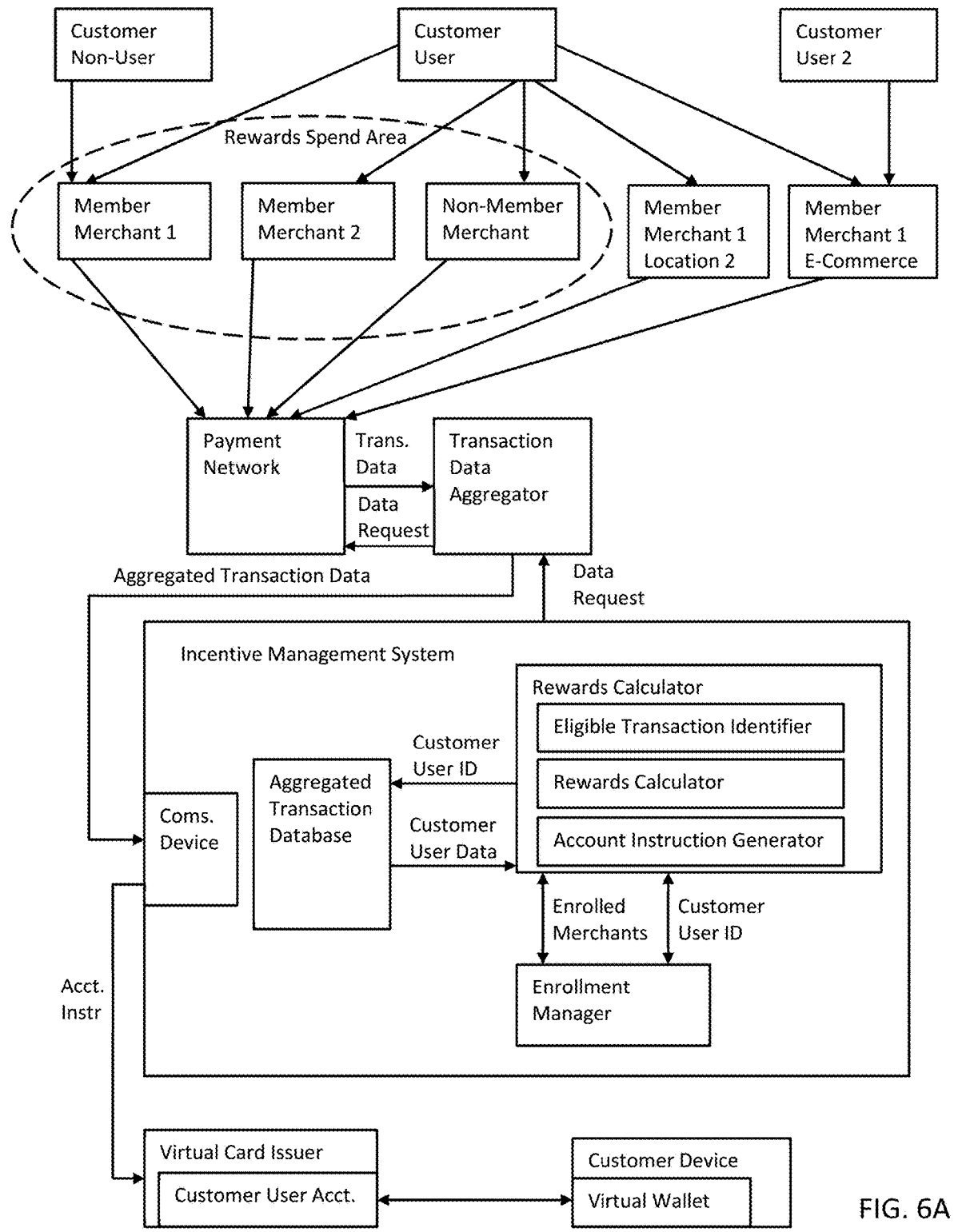
FIG. 6A is a simplified block diagram showing the relationship between systems and devices within and related to the transaction incentivizing system as pertains to customers earning rewards.
Figure 6B:
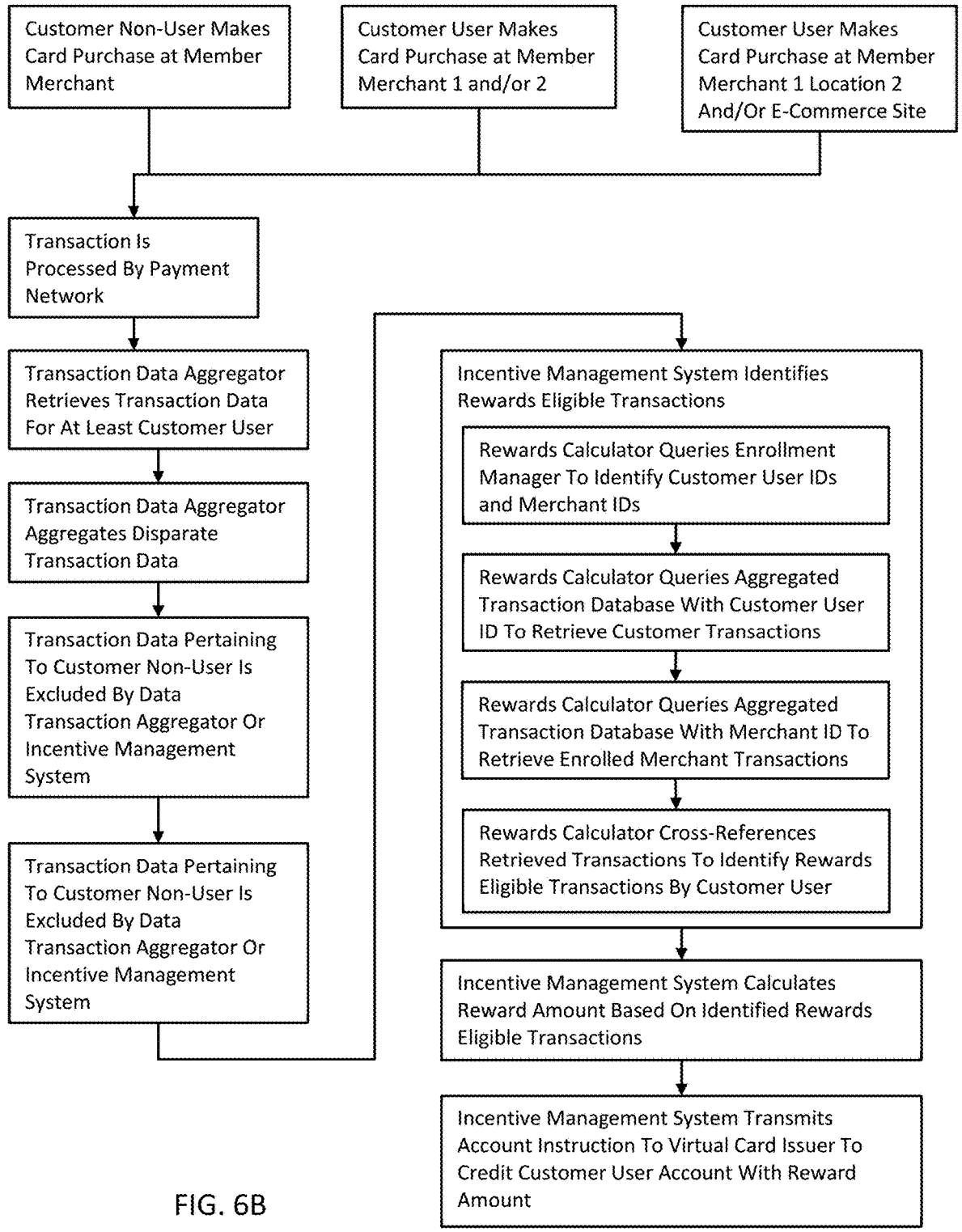
FIG. 6B is a flow chart showing steps of a method of generating rewards for customer purchases.

Referring now specifically to FIGS. 6A-6B, the process of identifying rewards eligible transactions, calculating rewards, and applying rewards to a virtual payment card account is shown in more detail and according to one embodiment. FIG. 6A shows a schematic of the data flow between a payment cardholder, merchant, payment network 102, transaction data aggregator 104, incentive management system 106, virtual card issuer 108, and enrolled payment cardholder device 118 in the context of enrolling the merchant. FIG. 6B shows a flowchart illustrates the steps taken to identify rewards eligible transaction, calculate rewards, and apply rewards to a virtual payment card account of an enrolled payment cardholder.

Figure 7A:
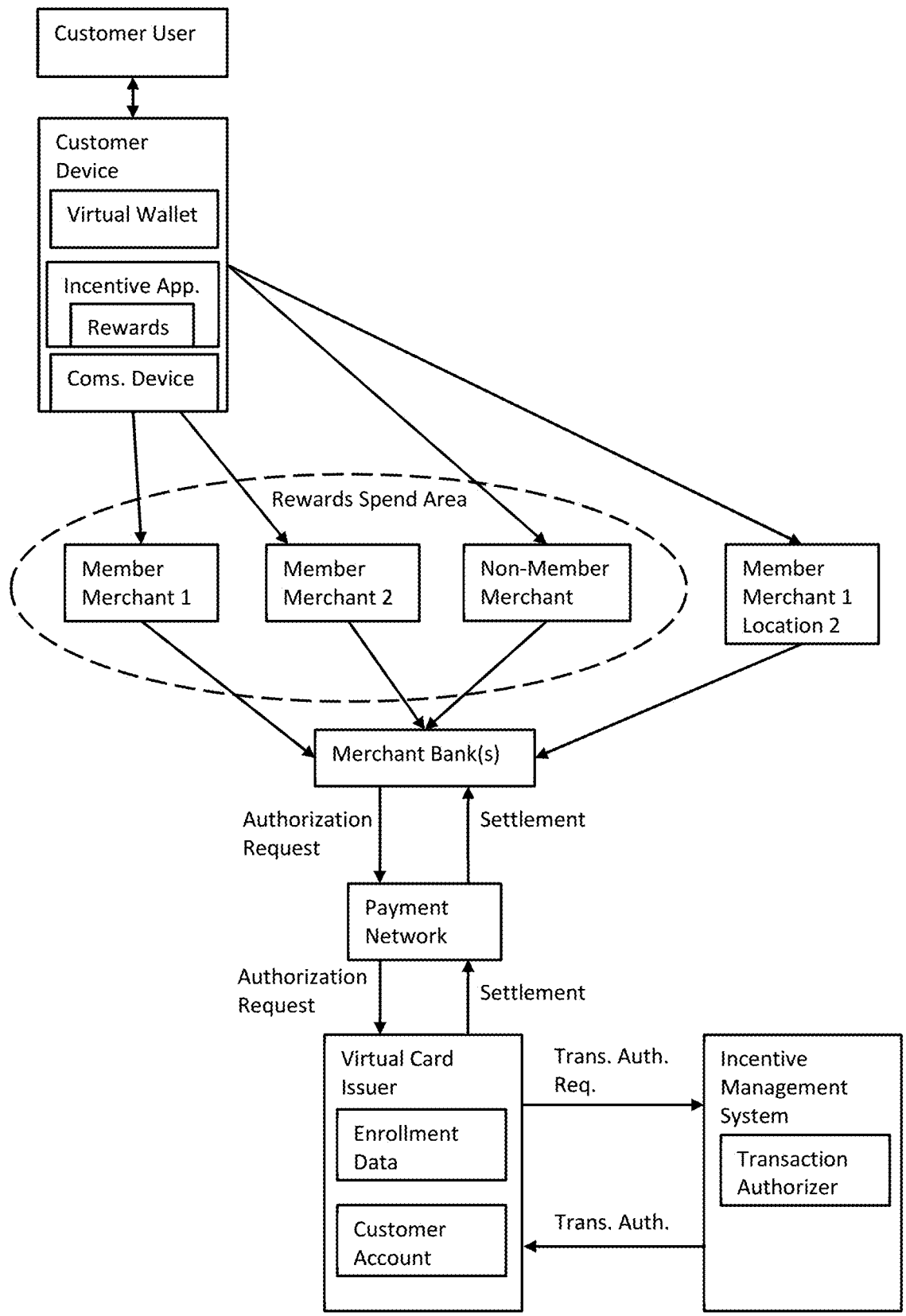
FIG. 7A is a simplified block diagram showing the relationship between system and devices within and related to the transaction incentivizing system as pertains to customers redeeming rewards.
Figure 7B:
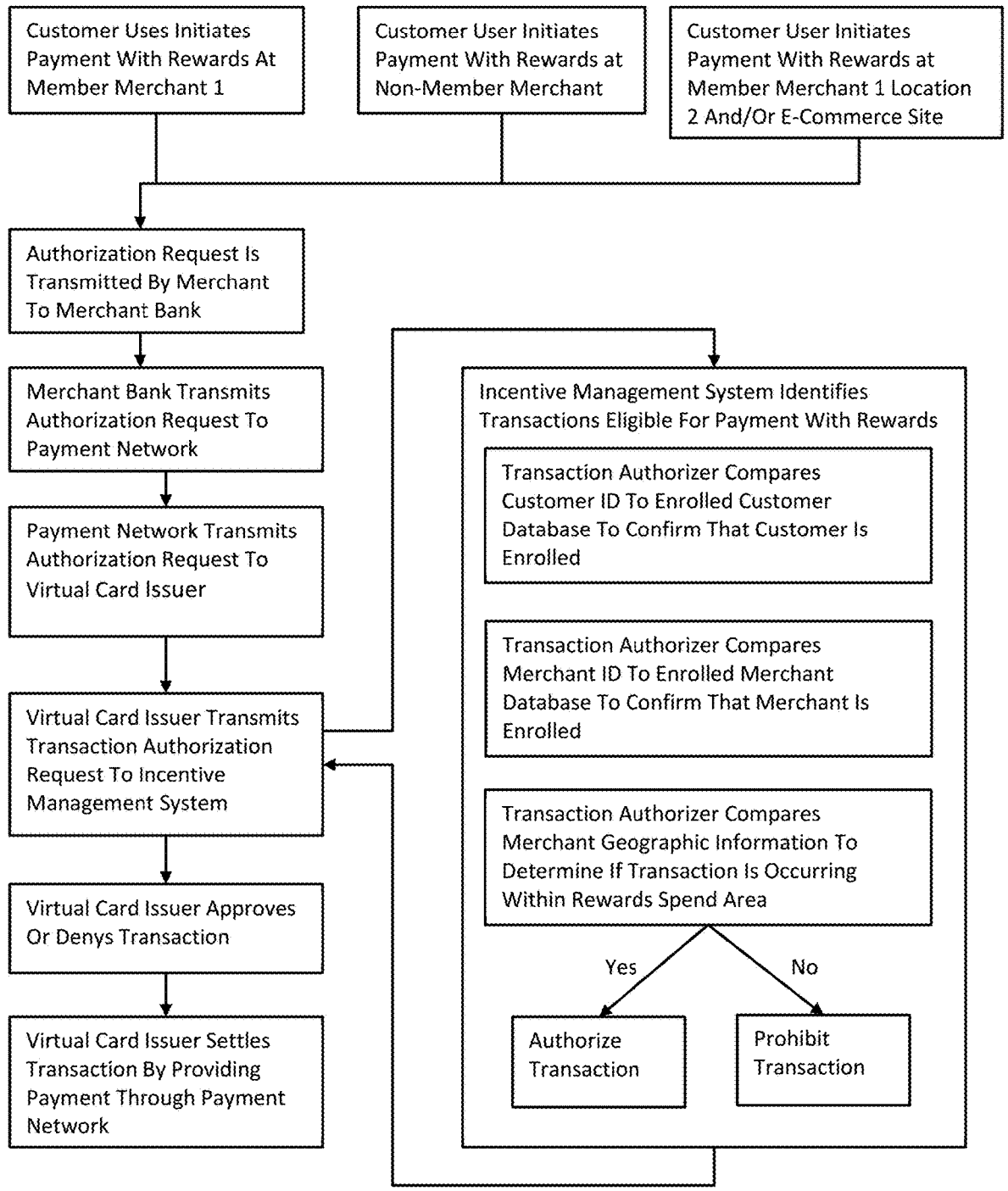
FIG. 7B is a flow chart showing steps of a method of customer redemption of earned rewards.

Referring now specifically to FIGS. 7A-7B, the process of authorizing the spending of rewards by a virtual payment card held by an enrolled payment cardholder is shown in more detail and according to one embodiment. FIG. 7A shows a schematic of the data flow between a payment cardholder's virtual wallet, merchant, payment network 102, virtual card issuer 108, and incentive management system 106 in the context of authorizing the spending of rewards using the virtual payment card and spending those rewards. FIG. 7B shows a flowchart illustrates the steps taken to process an adultization request for spending rewards using a virtual payment card and the spending of such rewards.

Referring now generally to FIGS. 1-7B, the process described herein is described in relation to a single payment card held by an enrolled payment cardholder. Purchases made with the single payment card being capable of earning rewards so long as the other conditions described herein are met. This description is made relative to a single payment card for simplicity. It should be understood that the same processes, methods, systems, equipment, etc. can be used with respect to a plurality of payment cards held by an enrolled payment cardholder. In such cases, identification information should be read to include such information for each payment card. To facilitate functioning of the system 100, the incentive management system 106 can, upon enrollment, generate a new enrolled payment cardholder master identification (e.g., master identification number). This number is attached to database entries that include cardholder identification information associated with the enrolled payment cardholder. Thus, the master identification is generated and associated with cardholder identification data stored in the enrolled payment cardholder database and associated with transactions including any of the payment cards held by the single enrolled payment cardholder. The master identification is also transmitted to the virtual card issuer 108 along with instructions to apply earned rewards such that rewards earned from purchases on multiple different payment cards are applied to the account of the common payment cardholder who has used their different payment cards. The master identification can be the account number associated with the virtual payment card issued by the virtual payment card issuer 108.

In an alternative embodiment, the same process is preformed but is instead driven by the virtual card issuer 108. When a payment cardholder is enrolled, the virtual card issuer 108 establishes (e.g., issues) a virtual card and creates an account. That account number is transmitted to the incentive management system 106 which then uses it as the master identification as just described in order to track rewards earned by a single enrolled payment cardholder through the use of multiple of their payment cards. Each payment card is separately added through the application on enrolled payment cardholder's device 118 and associated with the master identification by the incentive management system 106.

Likewise, identification data for merchants can encompass a single merchant's multiple locations and/or E-commerce website/application. This can be done with multiple entries and/or a master identification similar to the type previously described. This allows, for example, purchases at multiple locations and/or online purchases by an enrolled payment cardholder to earn rewards. Individual transactions can still be authorized based on the specific location of the merchant (regardless of the merchant having multiple locations) in order to geographically restrict the redemption of rewards consistent with such description herein. Therefore, the database of enrolled merchant identification data can include merchant identification data for a single merchant corresponding to both a physical location and an internet accessible purchase portal, such that the incentive management system 106 is adapted and configured to generate rewards for transactions conducted with an enrolled merchant for both physical location sales and internet sales. For a single enrolled merchant, the database of enrolled merchant identification data can include a first datum corresponding to the enrolled merchant's online storefront and includes a second datum corresponding to the enrolled merchant's physical storefront.

Still referring generally to FIGS. 1-7B, in some embodiments, the system 100 is capable of acquiring historical transaction data. This historical transaction data can be used to generate rewards but in the preferred embodiment is not. In the preferred embodiments of the system 100, the historical transaction data is used to predict future enrolled payment cardholder purchases, match the enrolled payment cardholder with new merchants or brands of potential interest based on past purchases and/or other data (e.g., recommend purchases), present offers to the enrolled payment cardholder, calculate a customer lifetime value of the enrolled payment cardholder, or perform other analytic processes. The system 100 provides an advantage in that it can acquire historical transaction data for these analytical processes. The system 100 also has an advantage in that the earning of rewards drives further transactions which can then be captured and used as inputs to these analytical processes. The system 100 also capture data that is typically not available from individual merchants due to their unwillingness or inability to collect or share such data. By acquiring transaction data (historic and/or prospective), the system is able to perform analytics of value to a shopping mall lessor, merchant, or other parties. The analytic processes capable of being performed thanks to the data collection provided by the system 100 are described in greater detail later herein.

As regards to acquiring historical transaction data, the incentive management system 106 can, in response to enrolling a payment cardholder, transmit a data request from the incentive management system to the transaction data aggregator 104 seeking transaction data associated with the enrolled payment cardholder, the data request seeking historical transaction data. The request includes at least cardholder identification information (e.g., a payment card number). The incentive management system 106 receives, from the transaction data aggregator 104, historical transaction data corresponding to transactions occurring before the payment cardholder was enrolled and to which the payment cardholder was a party. The historical transactions data can correspond to a time period of between one and three years prior to a date on which the payment cardholder is enrolled. The time period can also be up to two years prior to a date on which the payment cardholder is enrolled. The two-year period is particularly advantageous in that it has been found to encompass enough transactions information over a long enough period for meaningful use in analytic processes described herein while simultaneously remaining a reliable reflection of the enrolled payment cardholder's historical activity.

Figure 8A:
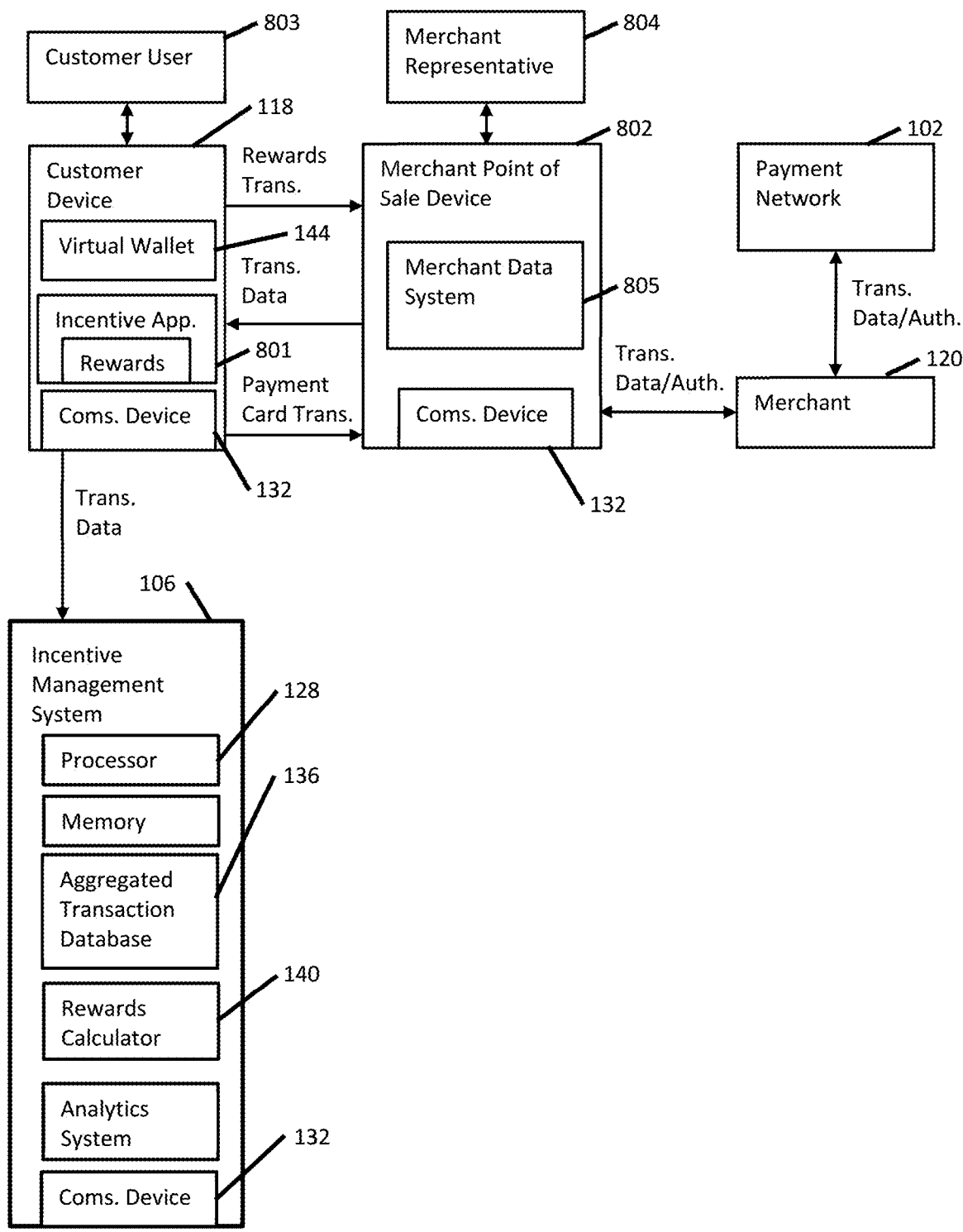
FIG. 8A is simplified block diagram showing the relationship between system s and devices within and related to the transaction incentivizing system as pertains to use of a customer device to bypass disparate merchant point of sale devices for the collection of transaction data.
Figure 8B:
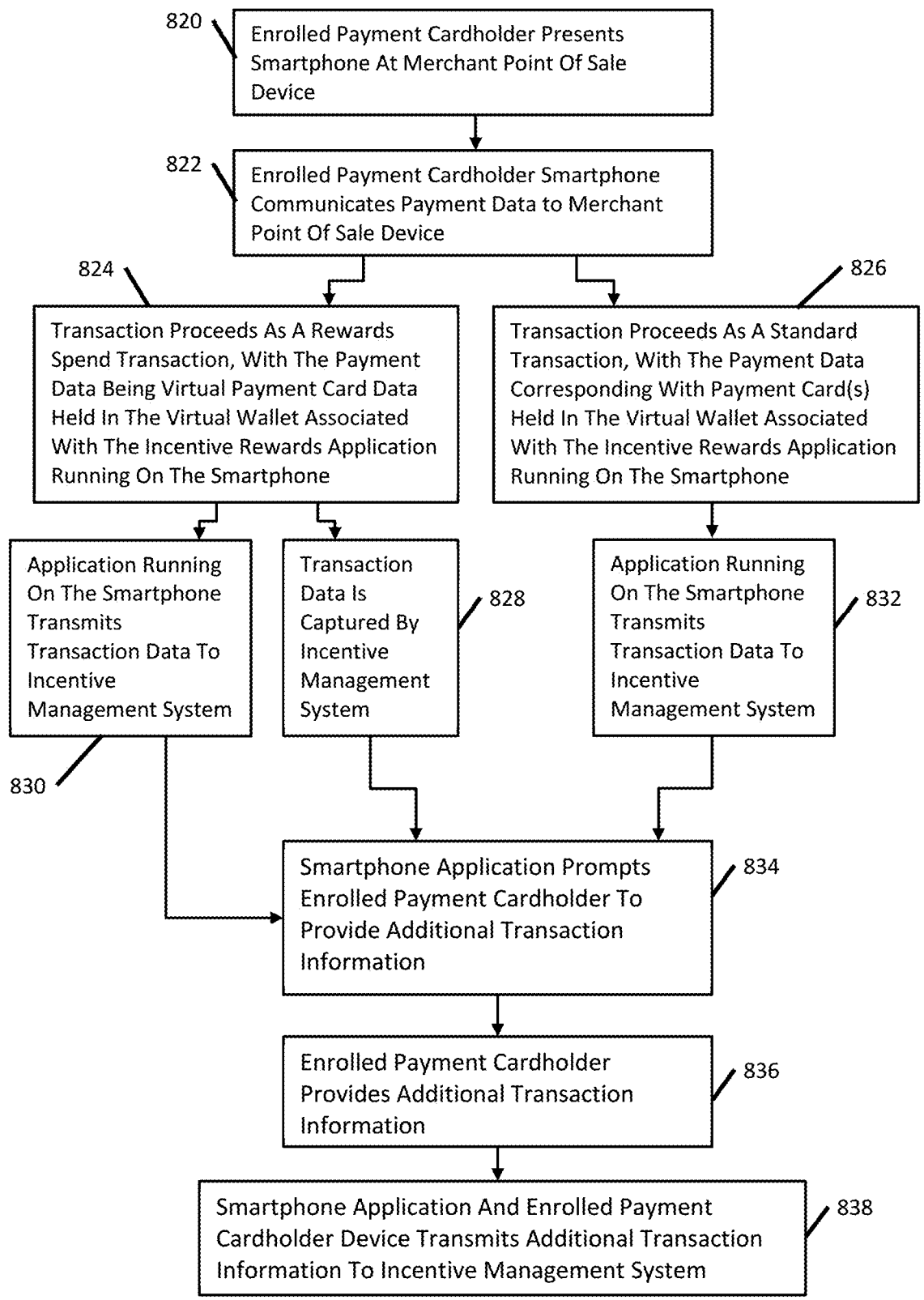
FIG. 8B is a flow chart showing steps of a method of using an enrolled cardholder device to collect transaction data from disparate merchant point of sale devices.

Turning now to FIGS. 8A-8B generally, the incentive management system 106 in combination with an application (e.g., incentive application 801) running on the enrolled payment cardholder's device 118, provides for transaction data collection that mitigates the problems associated with collecting transaction data from disparate merchant point of sale systems which can run different software, collect different data, have different data formats, etc. The system 100 bypasses the merchant point of sale devices (e.g., merchant point of sale device 802) to solve these problems. The system 100 can also collect data where a merchant is unwilling to provide such data to entities that can now operate system 100 (e.g., shopping mall operators/landlords).

In one embodiment, the customer device 118 (e.g., smartphone) assists in collecting/homogenizing payment transaction data acquired from disparate points of sale only in that allows for functioning of the rewards system described herein which provides for an incentive for enrolled payment cardholders to participate in the incentive system. This provides for data collection of the type previously described herein. In other words, the enrolled payment cardholder's device 118 allows for the spending of rewards earned in response to purchases, with the rewards being an incentive for allowing data collection by the incentive management system 100. In this way the customer device 118 facilitates transaction data collection indirectly as part of the system 100.

Referring now to FIG. 8A, in alternative embodiments, the enrolled payment cardholder's device 118 directly collects transaction data for the system 100. In making a rewards purchase, the enrolled customer user 803 presents the customer's device 118 (e.g., a smartphone) to a merchant point of sale device 802 operated by a merchant representative 804. The customer device 118 and the merchant point of sale device 802 communicate with one another to complete the purchase. This communication is facilitated by the respective communication devices 132 and can be or include near field communication, Bluetooth communication, Wi-Fi, or the like. The communication can also take the form of the merchant point of sale device 802 scanning a code displayed by the customer device 118 using the incentive application 801 running on the customer device 118. The incentive application 801 being an application of the type described herein.

To make a transaction with earned rewards (e.g., in a rewards transaction), the customer device 118, using the incentive application 801 and virtual wallet 144, transmits to the merchant point of sale device 802 virtual payment card information pertaining to the associated rewards account. The merchant point of sale device 802 supplies the virtual payment card information (e.g., account number) to the payment network 102 (e.g., via a merchant bank) as part of a transaction authorization request of the type described herein. The merchant point of sale device 802 can, in some embodiments, also store transaction information in a merchant data system 805. The information stored can be information such as the transaction amount, cardholder identification, stock keeping units associated with the purchased goods or services, date and/or time of purchase, or the like. In some embodiments, this purchase information is communicated back to the incentive application 801 facilitating the transaction using the virtual wallet 144. The incentive application 801 then transmits this information to the incentive management system 106. The application 801 and/or incentive management system 106 can parse the information received and process it for homogenizing the information kept regarding each transaction/enrolled payment cardholder 803. For example, date/time data can be formatted to a common format, certain data fields can be eliminated, stock keeping unit information can be given a merchant identifying prefix, and/or any other suitable data processing can be done to homogenize transaction data from disparate merchants.

In some embodiments, the same steps are carried out for transactions regardless of whether the transaction is spending rewards. For example, a transaction can be completed using a different payment card stored in the virtual wallet 144. In such a case, the data transmitted and received is the same as for the virtual payment card. The inceptive application 801 transmits the received transaction data to the incentive management system 106 as describe above with respect to transactions spending earned rewards.

The previously described embodiments rely on transaction data being provided to the customer device 118 from the merchant point of sale device 802. However, in some embodiments, the merchant point of sale device 802 cannot provide such information due to a lack of capability or by design on the part of the merchant 120. In such cases, the customer device 118 can transmit any available information such as time of transaction, a geolocation provided by the inceptive application 801 calling on a global position system device of the customer device 118, identification information (e.g., payment card or virtual payment card identification information), or the like. This information can be used to sync the transaction with transaction data captured using the system 100 as previously described herein (e.g., by matching information such as cardholder identification and time/date or transaction to information captured by the transaction data aggregator 104).

In some embodiments and regardless of whether the customer device 118 receives transaction information from the merchant point of sale device 802, the customer device 118, using the incentive application 801, can request additional information from the customer user 803. This additional information is transmitted to the incentive management system. The additional information can also be synced to otherwise captured transaction information using any suitable technique (e.g., matching transaction information to corresponding transaction information captured by data aggregator 104).

The additional information requested by the incentive application 801 can include information such as purchase amount, purchase location, merchant name, purchase time, identification of items/services purchased, identification of qualities (e.g., size, color, etc.) of items/services purchased, and/or other information associated with the transaction. This information can be requested through a prompt to the customer user 803 (e.g., enrolled payment cardholder) before, during, or after the transaction. The information can be entered by the customer user 803 using any combination of suitable techniques including but not limited to manually filing out form fields presented by the incentive application, selecting from a dropdown of options presented by the incentive application, or other manual data entry systems. The information can also be entered using a semiautomated process. For example, the incentive application 801 can prompt the customer user 803 to take a picture of a physical receipt provided by the merchant representative 804. The picture can be processed by the incentive application 801 and/or the incentive management system 106 to extract transaction information of the type described above (e.g., an identification of the product/service purchased, transaction amount, product/service price(s), or the like). Any suitable image processing technique can be used including but not limited to known optical character recognition algorithms. As another example, the incentive application 801 can prompt a user to scan barcodes associated with the purchases made during the transaction. The barcode(s) can be scanned using a camera of the customer device and using image processing techniques implemented by the incentive application 801 of any suitable type. Information extracted from the barcode (e.g., product identification) can then be transmitted to the incentive management system 106.

Referring now to FIG. 8B, a flowchart shows steps of data acquisition using an enrolled payment cardholder smartphone. In one step 820, an enrolled payment cardholder presents their device, in this case a smartphone, at a merchant point of sale device to make a purchase. The enrolled payment cardholder smartphone is presented in order to make a purchase using a payment card whose information is stored in the virtual wallet of the device and associated with the incentive application running on the device. This step can include launching and/or making active the incentive application running on the device. In some alternative embodiments, described herein and summarized later herein, the steps proceed with a payment cardholder presenting a physical payment card rather than presenting a payment card through a virtual wallet.

In step 822, the enrolled payment cardholder device (e.g., smartphone) communicates payment data to a merchant point of sale device. As previously explained, this communication can take various forms. In the preferred embodiment, the merchant point of sale device and the smartphone establish communications using near field communication equipment and protocols. The point of sale device requests payment information to be transmitted from the smartphone, with the payment information held in a virtual wallet. The virtual wallet provides the requested payment information through near field communication to the merchant point of sale device. Depending on what information is provided by the enrolled payment cardholder device, the transaction proceeds as a rewards spend transaction 824 or as a standard transaction 826. This depends on the type of information provided by the enrolled payment cardholder device. For example, upon receiving the request for payment information from the merchant point of sale device, the user device (e.g., the virtual wallet and/or incentive application) can prompt the user to select which payment information should be provided (e.g., choosing from earned rewards and one or more other traditional payment cards). In the case that the virtual wallet holds a single payment method (e.g., a virtual payment card associated with earned rewards), that transaction information can be automatically transmitted to the merchant point of sale device in response to a request for such information.

Referring now to the left side of the flowchart, when payment information corresponding to the virtual payment card associated with earned rewards is transmitted by the smartphone and received by the merchant point of sale device, the transaction proceeds as a rewards spend transaction 824. The rewards spend transaction occurs as previously described herein (e.g., including geographically limited transaction authorization). In one embodiment and in step 828, transaction data associated with the rewards spend is captured by the incentive management system 106. This occurs as previously described (e.g., with the transaction data aggregator 104 identifying the transaction and providing the transaction information to the incentive management system 106 for further processing).

Alternatively or additionally, in step 830, the application (e.g., incentive application) running on the user device (e.g., smartphone) transmits transaction data to the incentive management system 106. In such a case, the smartphone and the incentive application capture transaction information from the smartphone and/or transaction information received from the merchant point of sale device. For example and as previously described, the smartphone and incentive application can receive from the point of sale device information such as stock keeping unit(s), transaction amount, transaction time/date, or the like. Alternatively or additionally, the device and/or incentive application can collect information directly. For example and as previously described, in response to providing payment data the smartphone can acquire and transmit to the incentive management system information such as date/time, global positioning system data, or the like.

Returning now to step 826, the transaction proceeds as a standard transaction when the smartphone transmits standard payment card (e.g., not virtual rewards payment card) information to the merchant point of sale device. When the transaction proceeds, the transaction information can be captured by the transaction data aggregator 104 and provided to the incentive management system 106 using the techniques previously described herein. Alternatively or additionally and at step 832, the application running on the smartphone transmits transaction data to the incentive management system 106. This occurs as previously described herein (e.g., with respect to step 830).

Steps 820-832 allow transaction data to be captured for purchases made by enrolled cardholders using a cardholder device (e.g., smartphone). The data collection provided by steps 820-830 occur automatically. In other words, no additional steps by the cardholder are required other than making payment are required for data collection.

In some embodiments, the data collection can include further steps where the user takes additional actions to input data related to the transaction for the device to transmit to the incentive management system. In such cases, at step 834 the smartphone application (e.g., the incentive application) prompts the enrolled payment cardholder to provide additional transaction information. The prompt can take the form of a notification, opening of a window (e.g., a pop-up window), launching of an application, sub-routine, or the like. The prompt itself invites the user (e.g., the enrolled payment cardholder) to input additional transaction information. The input can be purely manual or partially manual and assisted by device and/or an application running thereon. The data and input methods and systems are of the type previously described herein. For example, purely manual inputs can include filling out fields or selecting from drop down menus information about the transaction such as identifying the product/service purchased, the transaction amount, qualities (e.g., color, size, or the like) of the product/service purchased, or the like. Information can also be input with assistance from the device and/or application(s). For example, the prompt can instruct the user to take a photograph of a transaction receipt or scan a product barcode. The incentive application can transmit the image to the incentive management system or can process the image using the device itself and transmit the information to the incentive management system. The images are processed using known techniques of the type previously described herein. The data is transmitted with identification information associated with the transaction (e.g., enrolled payment cardholder identification information) held within the incentive application.

It should be noted that in some embodiments, the customer device 118 has no interaction with the merchant point of sale device 802 other than providing payment card information. The customer device 118 does not receive transaction data from the merchant point of sale device 802. In such embodiments, transaction data is captured using the system 100 alone or in combination with user provided data through incentive application 801. This allows the system 100, including the customer device 118 and incentive application 801 and/or virtual wallet 144, to capture transaction data agnostic of the merchant point of sale system employed by merchants. This allows for data acquisition despite otherwise incompatible or unavailable merchant point of sale devices and associated data.

Generally, the functions, systems, processes, and the like described herein are implemented using software and database structures and operations of the type generally known in the art running on computing equipment of the type generally known in the art. Databases of the type described herein can, for example, refer to either a body of data, a relational database management system (RDBMS), or to both. A database can, for example, include any collection of data including hierarchical databases, relational databases, flat file databases, object-relational databases, object oriented databases, and any other structured collection of records or data that is stored in a computer system. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

With respect to the databases described herein, several database related operations are described such as querying databases, comparing entries between databases, adding entries to databases for established values, adding information to an existing database of a type not already recorded in the database, creating new databases, reading from databases, and the like. To carry out these functions any suitable database operators, instructions, requests, functions, programs, code, or the like known to one skilled in the art can be used. For example, databases may be operated using structed query language (SQL) and operations can be carried out using clauses (e.g., constituent components of statements and queries), expressions (e.g., commands to produce either scalar values, or tables consisting of columns and rows of data), predicates (e.g., that specify conditions that can be evaluated to SQL three-valued logic true/false/unknown or Boolean truth values and are used to limit the effects of statements and queries, or to change program flow), queries (e.g., that retrieve that data based on specific criteria), statements (e.g., that have a persistent effect on schemata and data, or may control transactions, program flow, connections, sessions, or diagnostics), or the like. In should be understood that regardless of the particular implementation of a database and the corresponding programming language, data can be written to, read from, manipulated, compared, or otherwise processed using known data processing techniques and associated known programming techniques.

As described herein, components of the system and/or other components communicate with one another through instructions, requests, or the like. It should be understood that instructions, requests, or the like as described herein are digital messages, communications, program instructions, or the like that communicate information using, for example, a digital message having a compatible format. The message can be formatted according to an application programming interface (API), standard, or the like. The instructions, requests, or the like are formatted such that they are processed by the receiving entity.

The communications devices referred to herein can be or include a modem, a network interface (such as an Ethernet card), a communications port, a PCMCIA slot and card, or the like. Information communicated through the communications device can be in the form of signals, which can be electronic, electromagnetic, optical, or other signals capable of being transmitted/received by a communications device. The communications devices can be or include wireless communication devices such as cellular communication chipsets, Bluetooth chipsets, NFC chipsets, antennas, global positioning system chipsets, WiFi chipsets, and the like. Communications using the communications devices can be made using any suitable technique to facilitate interoperability of the devices/systems/servers that are communicating. For example, the data request can be formatted to take advantage of an application programming interface (API) or other system that allows for the devices to communicate with one another. In this manner, the format of instructions, requests, returned information, and the like can be uniform or cross-operable between different components of the system. As described herein, digital messages are used to communicate data, executable instructions, and the like. Digital messages can include header, address information, or other information for routing and handling of the message by a network (e.g., TCP/IP information). The digital message can further include a payload in which the data, data request, executable instructions, or like are communicated. The message can be packetized.

Processor of the type described herein can, for example, include any programmable system including systems using micro-controllers, reduced instruction set circuits (RISC), application specific integrated circuits (ASICs), logic circuits, and any other circuit or processor capable of executing the functions described herein.

The functions and systems described herein are implemented using, in part, software, firmware, programs, functions, or the like as described herein. These data processing systems and techniques can, for example, include any computer program stored in memory for execution by a processor, including RAM memory, ROM memory, EPROM memory, EEPROM memory, and non-volatile RAM (NV RAM) memory.

In some embodiments, a computer program is provided which performs some or all of the functions described herein with respect to individual components of the system, and the program can be embodied on a computer readable medium. In some embodiments, portions of the system and portions of the associated functions are executed on a single computer system, without requiring a connection to a sever computer. In some embodiments, all or portions of the systems and/or components described herein are being run in a Windows® environment (Windows is a registered trademark of Microsoft Corporation, Redmond, Wash.). In yet another embodiment, all or portions of the systems and/or components described herein are run on a mainframe environment and a UNIX® server environment (UNIX is a registered trademark of X/Open Company Limited located in Reading, Berkshire, United Kingdom). Applications of the type described herein should be understood to be flexible and designed to run in various different environments without compromising any major functionality. In some embodiments, the system includes multiple components distributed among a plurality of computing devices. One or more components can be in the form of computer-executable instructions embodied in a computer-readable medium. The systems and processes are not limited to the specific embodiments described herein. The descriptions provided herein illustrate at least one example of carrying out the described functions. In addition, components of each system and each process can be practiced independent and separate from other components and processes described herein. Each component and process can also be used in combination with other assembly packages and processes.

Changes can be made in the above constructions without departing from the scope of the disclosure. It is intended that all matter contained in the above description or shown in the accompanying drawings shall be interpreted as illustrative and not in a limiting sense.

I claim:

1. A method for homogenizing payment transaction data acquisition from disparate merchant points of sale using an incentive management system to provide for geographically limited rewards earned for transaction and for sharing of transaction data with the incentive management system, the method comprising:
    tracking payment card transactions between enrolled payment cardholders and enrolled merchants by collecting, at the incentive management system, transaction data identified by a transaction data aggregator and transmitted to the incentive management system transaction data that includes an identifier of an enrolled payment cardholder, wherein the transaction data aggregator is in communication with a payment network adapted and configured to settle payment card transactions;
    based on the tracked payment card transactions creating, using the incentive management system, a database of rewards eligible transactions by cross referencing the tracked payment card transactions with a database of enrolled merchants to identify those transactions occurring between enrolled payment cardholders and enrolled merchants, placing those identified transactions into the database of rewards eligible transactions;
    for each rewards eligible transaction of the database of rewards eligible transactions applying a rewards factor to calculate a rewards amount;
    instructing, using the incentive management system, a virtual payment card issuer to apply the rewards amount for each rewards eligible transaction to an account associated with the corresponding enrolled payment cardholder;
    receiving, at the incentive management system, transaction authorization requests from the virtual payment card issuer corresponding to enrolled cardholders requesting to spend rewards within their corresponding account, wherein at least one transaction authorization request is a result of a merchant point of sale system receiving payment card data from a virtual wallet and from an enrolled payment cardholder device as part of a transaction with the enrolled payment cardholder;
    determining, at and using the incentive management system, if the transaction of the transaction authorization request occurred within a prescribed geographic area in which rewards can be spent at enrolled merchants;
    in response to determining that the transaction is occurring within the prescribed geographic area in which rewards can be spent, transmitting from the incentive management system and to the virtual payment card issuer, an authorization for the virtual card issuer to complete the transaction using the rewards;
    querying, using the incentive management system, the database of rewards eligible transactions and creating, using the incentive management system, a homogenized transaction database including a specific set of transaction datums retrieved from the database of rewards eligible transactions;
    collecting, using the enrolled payment cardholder device, transaction information associated with the transaction with the enrolled payment cardholder; transmitting, to the incentive management system and using the enrolled payment cardholder device, the transaction information collected using the enrolled payment cardholder device;
    receiving, at and using the incentive management system, the transaction information collected using the enrolled payment cardholder device; and
    adding, using the incentive management system, the received transaction information collected using the enrolled payment cardholder device to the homogenized transaction database,
    wherein the homogenized transaction database includes transaction information from at least a first transaction involving a first merchant using a first point of sale system and a second transaction involving a second merchant using a second point of sale system, the first point of sale system and the second point of sale system differing from one another.

2. A method in accordance with claim 1, wherein the incentive management system does not communicate with any merchant point of sale system.

3. A method in accordance with claim 1, wherein at least one transaction authorization request is a result of a merchant point of sale system receiving virtual payment card data from an enrolled payment cardholder device as part of a transaction with the enrolled payment cardholder using rewards, and wherein the incentive management system does not receive transaction data from the enrolled payment cardholder device.

4. A method in accordance with claim 1, wherein at least one transaction authorization request is a result of a merchant point of sale system receiving virtual payment card data from an enrolled payment cardholder device as part of a transaction with the enrolled payment cardholder using rewards, and wherein the homogenized transaction database is not created using transaction information received from the enrolled payment cardholder devices.

5. A method in accordance with claim 1, wherein at least one transaction authorization request is a result of a merchant point of sale system receiving virtual payment card data from an enrolled payment cardholder device as part of a transaction with the enrolled payment cardholder using rewards, and wherein the enrolled payment cardholder device does not communicate transaction information to the incentive management system.

6. A method in accordance with claim 1, wherein at least one transaction authorization request is a result of a merchant point of sale system receiving payment card data from a virtual wallet and from an enrolled payment cardholder device as part of a transaction with the enrolled payment cardholder, and wherein the enrolled payment cardholder device does not communicate transaction information to the incentive management system.

7. A method in accordance with claim 1, wherein the enrolled payment cardholder device collects the transaction information without first receiving an instruction to do so from the incentive management system.

8. A method in accordance with claim 1 whereby datums not included in the homogenized transaction database but included in any particular entry of the first set of transaction data are ignored, and whereby datums included in the homogenized transaction database but not included in any particular entry of the first set of transaction data are entered into the homogenized transaction database with a nominal value.

9. A method in accordance with claim 1 wherein the first point of sale system and the second point of sale system are not compatible within one another.

10. A method in accordance with claim 1 wherein the first point of sale system and the second point of sale system operate using different data formats.

11. A method in accordance with claim 1 wherein the first point of sale system and the second point of sale system operate in such a manner that the two point of sale systems collect different transaction datums.

12. A method for homogenizing payment transaction data acquisition from disparate merchant points of sale, the method comprising:
  incentivizing repeat transactions between payment cardholders and merchants within a prescribed geographic area comprising:
    acquiring, in response to a data request, a first set of transaction data from a payment network at and using a transaction data aggregator, the payment network comprising a server adapted and configured to communicate with merchant banks and payment card issuing banks to settle transactions between payment cardholders and merchants;
    creating, at and using the incentive management system, a database of a second set of transaction data, the second set of transaction data being a subset of the first set of transaction data, the database of the second set of transaction data created by at least (1) comparing the first set of transaction data to a database of enrolled payment cardholder identification data and selecting those transactions in the first set of transaction data that include identification information associated with enrolled payment cardholders and stored in the database of enrolled payment cardholder identification data or (2) comparing the first set of transaction data to a database of enrolled merchant identification data and selecting those transactions in the first set of transaction data that include identification information associated with enrolled merchants and stored in the database of enrolled merchant identification data, wherein the selected transactions are entered into the database of the second set of transaction data;
    identifying, at and using the incentive management system, rewards eligible transactions and creating a database of rewards eligible transactions by at least (1) comparing the database of the second set of transaction data, when said database includes transactions selected as including identification information associated with enrolled payment cardholders, to a database of enrolled merchant identification data and selecting those transactions that include identification data matching identification data within the database of enrolled merchant identification data or (2) comparing the database of the second set of transaction data, when said database includes transaction selected as including identification information associated with enrolled merchants, to a database of enrolled payment cardholders and selecting those transactions that include identification data matching identification data within the database of enrolled payment cardholders identification data;
    calculating rewards, at and using the incentive management system, by querying the database of rewards eligible transactions to determine, for each transaction, a dollar amount of the transaction,
    multiplying the dollar amount by a rewards factor to calculate a rewards amount for each rewards eligible transaction within the database of rewards eligible transactions;
    transmitting, from the incentive management system and for each transaction within the database of rewards eligible transactions, an instruction to a virtual card issuer to apply the rewards amount to an account corresponding to the cardholder identification data associated with the eligible transaction within the database of rewards eligible transactions, the instruction including the rewards amount and a cardholder identification, the account being tied to a virtual payment card issued by the virtual card issuer;
    receiving, at and using the incentive management system and from the virtual card issuer, a transaction authorization request associated with a transaction initiated by an enrolled payment cardholder to make a purchase using rewards, the transaction authorization request including transaction data including at least enrolled payment cardholder identification information and merchant identification information, the transaction authorization request being a result of a merchant point of sale system receiving payment card data from a virtual wallet and from an enrolled payment cardholder device as part of a transaction with the enrolled payment cardholder;
    determining, at and using the incentive management system, if the transaction of the transaction authorization request occurred within a prescribed geographic area in which rewards can be spent at enrolled merchants; and
    in response to determining that the transaction is occurring within the prescribed geographic area in which rewards can be spent, transmitting from the incentive management system and to the virtual card issuer, an authorization for the virtual card issuer to complete the transaction using the rewards;
    querying, using the incentive management system, the first set of transaction data to identify all transaction data including an enrolled cardholder identification and creating, using the incentive management system, a homogenized transaction database using the identified transactions and including a specific set of transaction datums;
    collecting, using the enrolled payment cardholder device, transaction information associated with the transaction with the enrolled payment cardholder;
    transmitting, to the incentive management system and using the enrolled payment cardholder device, the transaction information collected using the enrolled payment cardholder device;

receiving, at and using the incentive management system, the transaction information collected using the enrolled payment cardholder device; and adding, using the incentive management system, the received transaction information collected using the enrolled payment cardholder device to the homogenized transaction database, wherein the homogenized transaction database includes transaction information from at least a first transaction involving a first merchant using a first point of sale system and a second transaction involving a second merchant using a second point of sale system, the first point of sale system and the second point of sale system differing from one another.

13. A method in accordance with claim 12, wherein the incentive management system does not communicate with any merchant point of sale system.

14. A method in accordance with claim 12, wherein the enrolled payment cardholder device collects the transaction information without first receiving an instruction to do so from the incentive management system.

15. A method in accordance with claim 12 whereby datums not included in the homogenized transaction database but included in any particular entry of the first set of transaction data are ignored, and whereby datums included in the homogenized transaction database but not included in any particular entry of the first set of transaction data are entered into the homogenized transaction database with a nominal value.

16. A method in accordance with claim 12 wherein the first point of sale system and the second point of sale system are not compatible within one another.

17. A method for incentivizing repeat transactions with merchants within a prescribed geographic area using payment processing network data, an incentive management system server, a transaction data aggregator server, and a virtual card issuer server, each of the servers including a processor, memory, and communications device, and each of the servers adapted and configured to communicate with other servers, the method comprising:

transmitting, from the incentive management system server and to the transaction data aggregator server, a request for transaction data associated with at least one enrolled user, the request for transaction data including at least one user identification associated with the at least one enrolled user, the request for transaction data being formatted by the inventive management system to be handled by the transaction data aggregator server;

receiving, at the incentive management system server and from the transaction data aggregator server, user transaction data corresponding to the at least one enrolled user, the user transaction data including only transactions that are identified as being made by the at least one enrolled user, and building a database of transactions made by enrolled users, the database of transactions including, for each transaction, at least a cardholder identification, a merchant identification, and a transaction amount;

querying, using the incentive management system server, a database of enrolled merchants established and maintained by the incentive management system server, and retrieving an array of enrolled merchant identifications;

establishing a rewards eligible transaction database, using the incentive management server, by querying the database of transactions made by enrolled users with the array of enrolled merchant identifications to identify transactions made between enrolled users and enrolled merchants, those transactions including both identifications associated with an enrolled user and identifications associated with an enrolled merchant, the identified transactions being arranged in an array to form the rewards eligible transaction database;

calculating rewards, at and using the incentive management server, by querying the database of rewards eligible transactions to determine, for each transaction, a dollar amount of the transaction, the dollar amount having been received initially from the transaction data aggregator server and maintained in association with other transaction data including identifications, and multiplying the dollar amount by a rewards factor to calculate a rewards amount for each rewards eligible transaction within the database of rewards eligible transaction;

transmitting, from the incentive management server and for each transaction with the database of rewards eligible transactions, an instruction to a virtual card issuer server to apply the rewards amount to an account corresponding to the enrolled user identification associated with the rewards eligible transaction in the database of rewards eligible transactions, the instruction including the rewards amount and an enrolled user identification, the account being tied to a virtual payment card issued by the virtual card issuer server;

receiving, at an using the incentive management server, a transaction authorization request associated with a transaction initiated by an enrolled user to make a purchase with rewards held within the rewards account maintained by the virtual card issuer server, the transaction authorization request including transaction data including at least enrolled user identification information and merchant identification information, the transaction authorization request being a result of a merchant point of sale system receiving payment card data from a virtual wallet and from an enrolled payment cardholder device as part of a transaction with the enrolled payment cardholder;

determining, at and using the incentive management system server and in response to receiving the transaction authorization request, if the transaction of the transaction authorization request occurred within a prescribed geographic area in which rewards can be spent at enrolled merchants;

in response to determining that the transaction is occurring within the prescribed geographic area in which rewards can be spent, transmitting an authorization to complete the transaction using rewards;

querying, using the incentive management server, user transaction data corresponding to the at least one enrolled user received at the incentive management system server and from the transaction data aggregator server, and creating, using the incentive management server, a homogenized transaction database using the received transaction data and including a specific set of transaction datums;

collecting, using the enrolled payment cardholder device, transaction information associated with the transaction with the enrolled payment cardholder;

transmitting, to the incentive management system server and using the enrolled payment cardholder device, the transaction information collected using the enrolled payment cardholder device;

receiving, at and using the incentive management system server, the transaction information collected using the enrolled payment cardholder device; and adding, using the incentive management system server, the received transaction information collected using the enrolled payment cardholder device to the homogenized transaction database, wherein the homogenized transaction database includes transaction information from at least a first transaction involving a first merchant using a first point of sale system and a second transaction involving a second merchant using a second point of sale system, the first point of sale system and the second point of sale system differing from one another.

18. A method in accordance with claim 17, wherein the incentive management system does not communicate with any merchant point of sale system.

* * * * *